(12) United States Patent
Xu et al.

(10) Patent No.: US 12,293,451 B2
(45) Date of Patent: May 6, 2025

(54) ILLUMINATION RENDERING METHOD AND APPARATUS, COMPUTER DEVICE, AND STORAGE MEDIUM

(71) Applicant: Tencent Technology (Shenzhen) Company Limited, Shenzhen (CN)

(72) Inventors: Huabing Xu, Shenzhen (CN); Shun Cao, Shenzhen (CN); Yuanheng Li, Shenzhen (CN); Nan Wei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 309 days.

(21) Appl. No.: 17/985,107

(22) Filed: Nov. 10, 2022

(65) Prior Publication Data
US 2023/0076326 A1 Mar. 9, 2023

Related U.S. Application Data

(63) Continuation of application No. PCT/CN2022/081063, filed on Mar. 16, 2022.

(30) Foreign Application Priority Data

Apr. 2, 2021 (CN) .......................... 202110359533.9

(51) Int. Cl.
*G06T 15/50* (2011.01)
*A63F 13/52* (2014.01)
(Continued)

(52) U.S. Cl.
CPC ............ *G06T 15/506* (2013.01); *A63F 13/52* (2014.09); *G06T 15/04* (2013.01); *G06T 15/06* (2013.01); *G06T 15/55* (2013.01)

(58) Field of Classification Search
CPC ....... G06T 15/506; G06T 15/04; G06T 15/06; G06T 15/55; A63F 13/52
See application file for complete search history.

(56) References Cited

U.S. PATENT DOCUMENTS

2013/0335434 A1 12/2013 Wang et al.
2017/0263043 A1 9/2017 Peterson et al.

FOREIGN PATENT DOCUMENTS

| CN | 1889128 A | 1/2007 |
|---|---|---|
| CN | 102855400 A | 1/2013 |

(Continued)

OTHER PUBLICATIONS

Tencent Technology, WO, PCT/CN2022/081063, May 23, 2022, 6 pgs.

(Continued)

*Primary Examiner* — Werner G Garner
(74) *Attorney, Agent, or Firm* — Morgan, Lewis & Bockius LLP

(57) ABSTRACT

This application relates to an illumination rendering method performed by a computer device. The method include: determining light source change information when a light source changes in a virtual scene; determining a current light source projection coefficient corresponding to the changed light source according to the light source change information; determining an indirect illumination value of a target pixel point in the virtual scene according to a radiance transfer parameter corresponding to the target pixel point in the virtual scene and the current light source projection coefficient; determining a direct illumination value corresponding to the target pixel point under the changed light source; and performing illumination rendering on the target pixel point according to the direct illumination value and the indirect illumination value.

20 Claims, 12 Drawing Sheets

(51) Int. Cl.
G06T 15/04 (2011.01)
G06T 15/06 (2011.01)
G06T 15/55 (2011.01)

(56) References Cited

FOREIGN PATENT DOCUMENTS

| | | |
|---|---|---|
| CN | 106981087 A | 7/2017 |
| CN | 111420404 A | 7/2020 |
| CN | 112927341 A | 6/2021 |

OTHER PUBLICATIONS

Tencent Technology, IPRP, PCT/CN2022/081063, Oct. 3, 2023, 7 pgs.
Tencent Technology, ISR, PCT/CN2022/081063, May 23, 2022, 3 pgs.
Rui Wang, et al. "Precomputed Radiance Transfer for Real-Time Indirect Lighting Using a Spectral Mesh Basis", Eurographics Symposium on Rendering, Dec. 31, 2007, 9 pgs.

ILLUMINATION RENDERING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2022/081063, entitled "LIGHTING RENDERING METHODS, DEVICES, COMPUTER EQUIPMENT, AND STORAGE MEDIA" filed on Mar. 16, 2022, which claims priority to Chinese Patent Application No. 202110359533.9, filed with the State Intellectual Property Office of the People's Republic of China on Apr. 2, 2021, and entitled "ILLUMINATION RENDERING METHOD AND APPARATUS, COMPUTER DEVICE, AND STORAGE MEDIUM", all of which are incorporated herein by reference in their entirety.

FIELD OF THE TECHNOLOGY

This application relates to the field of image processing technologies, and in particular, to an illumination rendering method and apparatus, a computer device, and a storage medium.

BACKGROUND OF THE DISCLOSURE

In image rendering, to achieve a realistic scene illumination effect, global illumination needs to be specified in a renderer. The global illumination shows a comprehensive effect of direct illumination and indirect illumination. For example, the global illumination can be implemented through ray tracing, ambient occlusion, a light probe, or the like. After being emitted from a light source, light rays are reflected and refracted a lot of times after encountering obstacles, all the surfaces and corners of objects in a virtual scene have a sense of light.

However, because the existing rendering method is not suitable for a dynamic illumination scene, the illumination rendering effect under the dynamic illumination scene is poor.

SUMMARY

According to various embodiments provided in this application, an illumination rendering method and apparatus, a computer device, a storage medium, and a computer program product are provided.

An illumination rendering method is provided, performed by a computer device, the method including:

determining light source change information when a light source changes in a virtual scene;

determining a current light source projection coefficient corresponding to the changed light source according to the light source change information;

determining an indirect illumination value of a target pixel point in the virtual scene according to a radiance transfer parameter corresponding to the target pixel point in the virtual scene and the current light source projection coefficient;

determining a direct illumination value corresponding to the target pixel point under the changed light source; and performing illumination rendering on the target pixel point according to the direct illumination value and the indirect illumination value.

An illumination rendering apparatus is provided, including:

a light source determining module, configured to determine light source change information when a light source changes in a virtual scene;

a projection coefficient update module, configured to determine a current light source projection coefficient corresponding to the changed light source according to the light source change information;

an indirect illumination determining module, configured to determine an indirect illumination value of a target pixel point in the virtual scene according to a radiance transfer parameter corresponding to the target pixel point in the virtual scene and the current light source projection coefficient;

a direct illumination determining module, configured to determine a direct illumination value corresponding to the target pixel point under the changed light source; and an illumination rendering module, configured to perform illumination rendering on the target pixel point according to the direct illumination value and the indirect illumination value.

A computer device is provided, including a memory and one or more processors, the memory storing computer-readable instructions, the computer-readable instructions, when executed by the one or more processors, causing the computer device to perform the operations in the foregoing illumination rendering method.

One or more non-transitory readable storage media are provided, storing computer-readable instructions, the computer-readable instructions, when executed by one or more processors of a computer device, causing the computer device to implement the operations in the foregoing illumination rendering method.

A computer program product is provided, including computer-readable instructions, the computer-readable instructions, when executed by a processor, implementing the operations in the foregoing illumination rendering method.

Details of one or more embodiments of this application are provided in the accompanying drawings and descriptions below. Other features, objectives, and advantages of this application will become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from the accompanying drawings without creative efforts.

DESCRIPTION OF EMBODIMENTS

To make the objectives, technical solutions, and advantages of this application clearer and more understandable, this application is further described in detail below with reference to accompanying drawings and embodiments. It is to be understood that the specific embodiments described herein are only used for explaining this application, and are not used for limiting this application.

The illumination rendering method provided in this application is applicable to a computer device. The computer device may be a terminal or a server. The illumination rendering method provided in this application is applicable to a terminal or a server, or is applicable to a system including a terminal and a server, and implemented through interaction between a terminal and a server.

Figure 1:
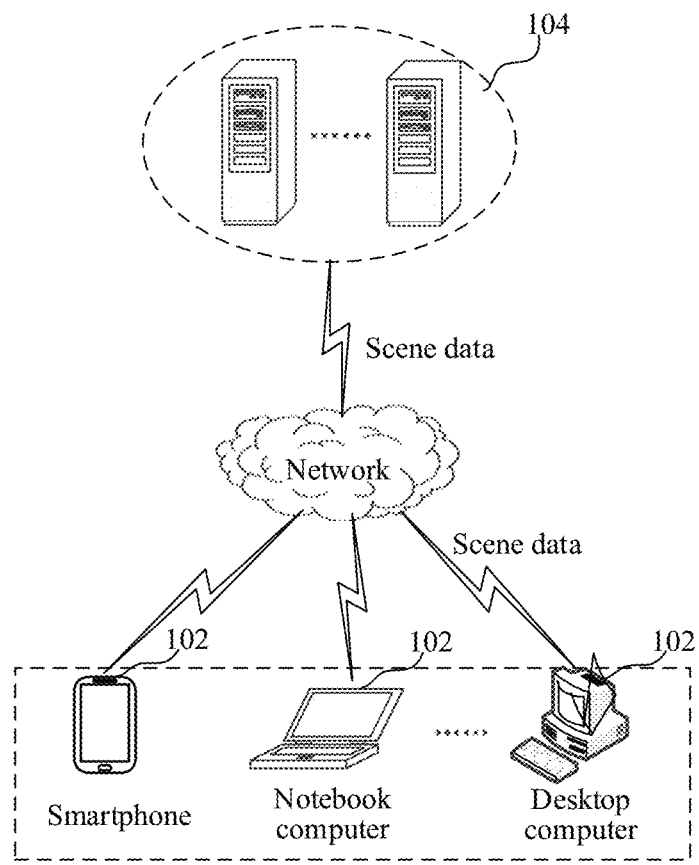
FIG. 1 is a diagram of an application environment of an illumination rendering method according to some embodiments.

The illumination rendering method provided in this application is applicable to the application environment shown in FIG. 1. A terminal 102 communicates with a server 104 through a network. Specifically, the terminal 102 may obtain scene data corresponding to a virtual scene from the server 104. The scene data includes illumination data such as a light source, light source change information, and a light source projection coefficient. In a processing of running a virtual scene, the terminal 102 determines light source change information when a light source in the virtual scene changes. The terminal 102 then determines a current light source projection coefficient corresponding to the changed light source according to the light source change information; determines an indirect illumination value of a target pixel point in the virtual scene according to a radiance transfer parameter corresponding to the target pixel point and the current light source projection coefficient; determines a direct illumination value corresponding to the target pixel point under the changed light source; and performs illumination rendering on the target pixel point according to the direct illumination value and the indirect illumination value.

The terminal 102 may be a smartphone, a tablet computer, a notebook computer, a desktop computer, a smart speaker, a smartwatch, or the like, but is not limited thereto. The server 104 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 and the server 104 may be directly or indirectly connected in a wired or wireless communication manner. This is not limited in this application.

The illumination rendering method in this application may be a method for performing image processing on a target pixel point in a to-be-rendered image in a virtual scene based on the computer vision technology, to effectively enhance the illumination rendering effect in a dynamic illumination scene.

Figure 2:
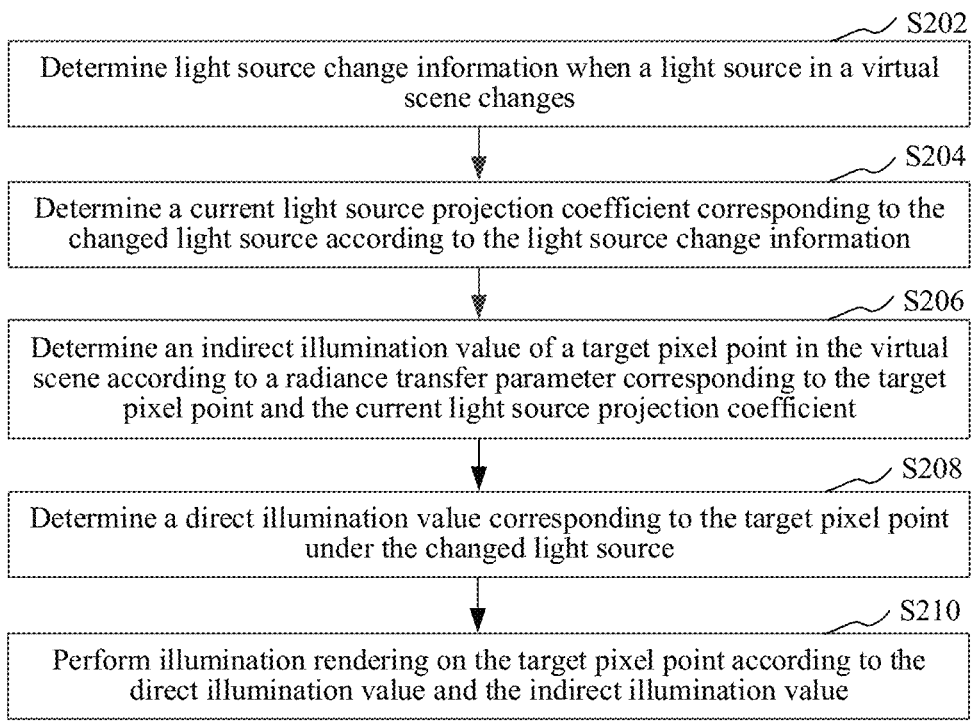
FIG. 2 is a schematic diagram of an illumination rendering method according to some embodiments.

In some embodiments, as shown in FIG. 2, an illumination rendering method is provided. Descriptions are provided by using an example in which the method is applied to a computer device. The computer device may be specifically a terminal or a server in FIG. 1. The method can also be applied to a system including a terminal and a server, and is implemented through interaction of the terminal and the server. In this embodiment, the method includes following steps:

S202: Determine light source change information when a light source changes in a virtual scene.

The virtual scene refers to a digitized scene outlined by a computer using the digital communication technology, includes a two-dimensional virtual scene and a three-dimensional virtual scene, and can realistically simulate, by using the virtualization technology, information, such as various material forms, spatial relationships, in the world. The three-dimensional virtual scene can display a shape of an object more beautifully, and can also display the virtual reality world more intuitively. For example, an object in a three-dimensional virtual scene may include at least one of terrain, a house, a tree, a character, or the like. The virtual scene is applied increasingly widely. For example, the virtual scene can be applied to scenarios such as game development and video production.

The virtual scene can be displayed by using computer three-dimensional graphics. A three-dimensional simulated environment can be displayed on the screen. All objects in the virtual scene can be described by three-dimensional scene data. For example, three-dimensional scene data can be loaded into a three-dimensional scene, to display a three-dimensional simulated environment. The three-dimensional scene data includes at least one of model data, texture data, illumination data, vector data, terrain data, raster volume data, or the like. The illumination data includes at least one of a light source, light source change information, or the like.

The terminal can perform a series of rendering processing on a scene screen in the virtual scene, so that screen content in the virtual scene is displayed on a screen in the form of a two-dimensional image. In computer graphics, rendering refers to a process of two-dimensionally projecting an object model in a three-dimensional scene into a digital image according to environment, material, illumination, and rendering parameters that have been set. The illumination rendering is a process of converting three-dimensional radiosity processing into a two-dimensional image. An entity in the virtual scene and environment is presented in a three-dimensional form, which is closer to the real world and is easy to operate and transform. After a series of rendering processing, such as vertex rendering, shading rendering, and illumination rendering, are performed on a to-be-displayed pixel point in the virtual scene, a rendering effect of the virtual scene is made more refined and beautiful.

A light source refers to an object that can emit light by itself and that is emitting light. The light source includes, but is not limited to, at least one of the sun, an electric light, or a burning substance. A light source in a virtual scene is a series of illumination data that can realistically model an illumination effect of a light source in reality.

The light source in the virtual scene has its illumination calculated through the light and dark distribution and the color distribution on surfaces of an irradiated object, and makes the irradiated object and its surrounding environment have a contrast of light and dark and a color contrast, so as to show an illumination effect of the object. Different from the light source in reality, the light source in the virtual scene may be a virtual light source node without a shape or a contour.

For example, an illumination effect of an irradiated object can be calculated according to a position of the light source in the virtual scene, and a viewer (observer) cannot see the light source itself. Similar to the light source in reality, when a colored light source in the virtual scene is projected onto surfaces of a colored object, a final rendered color depends on reflection and absorbance of light. A three-dimensional geometric model may also be pre-constructed based on the virtual scene, to construct a shadow effect when the light source in the virtual scene is irradiated on the object in the virtual scene.

In the virtual scene, a simulated illumination effect can be achieved by simulating propagation of light in the environment. Light can be propagated along a straight line in a medium, and when encountering an obstacle, such as an object, in the process of propagation, the light may be reflected, scattered, diffusely reflected, absorbed, and so on. Light has different reflection transmittances on surfaces of objects of different materials. For example, when being propagated to a specular surface, light may be reflected, and its reflection transmittance is high. When being propagated to a desktop, light may be diffusely reflected, and its reflection transmittance is attenuated.

When a light source in the virtual scene changes, the ambient illumination effect in the virtual scene also changes accordingly. The light source change information refers to change information generated by the changed light source relative to a light source before the change in the virtual scene. The light source change information may include at least one of light source position change information, light source intensity change information, or light source direction change information.

Specifically, in a process of displaying a virtual scene or running an application including a virtual scene, when detecting that a light source in the virtual scene changes, the terminal obtains current light source information, and compares the current light source information with light source information before the light source changes, to determine the light source change information.

S204: Determine a current light source projection coefficient corresponding to the changed light source according to the light source change information.

The light source projection coefficient refers to a light intensity coefficient corresponding to the light source. There is a linear relationship between the light source and the light source projection coefficient, and different light sources correspond to different projection coefficients. For example, the light source in the virtual scene can be regarded as a virtual light source, that is, a set of light source functions. The set of coefficients are obtained by projecting the virtual light source onto a projection basis function, and this set of coefficients is the light source projection coefficient. The current light source projection coefficient refers to a light source projection coefficient corresponding to the changed light source.

In mathematics, the basis function is an element of a particular base in the function space. In the function space, each successive function can be represented as a linear combination of basis functions. The basis function is also referred to as a blend function, and basis functions can be blended as an interpolation function. The projection basis function refers to inputting a light source into a basis function to calculate the reflection of light source light through the basis function.

In some embodiments, the projection basis function may be specifically a spherical harmonic function. The spherical harmonic function is to limit a harmonic function satisfying the Laplace equation to a unit sphere under a spherical coordinate system, and can be used to represent the directional distribution on the spherical surface. In graphics, the spherical harmonic function is a generalized Fourier transform defined on a sphere, can parameterize a discrete spherical function, to simulate low-frequency ambient light illumination, and for example, is used to represent a direction-related function such as a bidirectional reflection distribution (BRDF) function of a surface of an object in the virtual scene, an environment texture function, a light transmission function, and a visibility distribution function. The spherical harmonic function may be used to capture illumination, and then perform re-illumination processing to calculate global illumination in the virtual environment in real time. In other embodiments, for the projection basis function, a spherical Gaussian function, a custom piecewise function, or the like may also be used as a projection basis function, which is not limited in this application.

Figure 3:
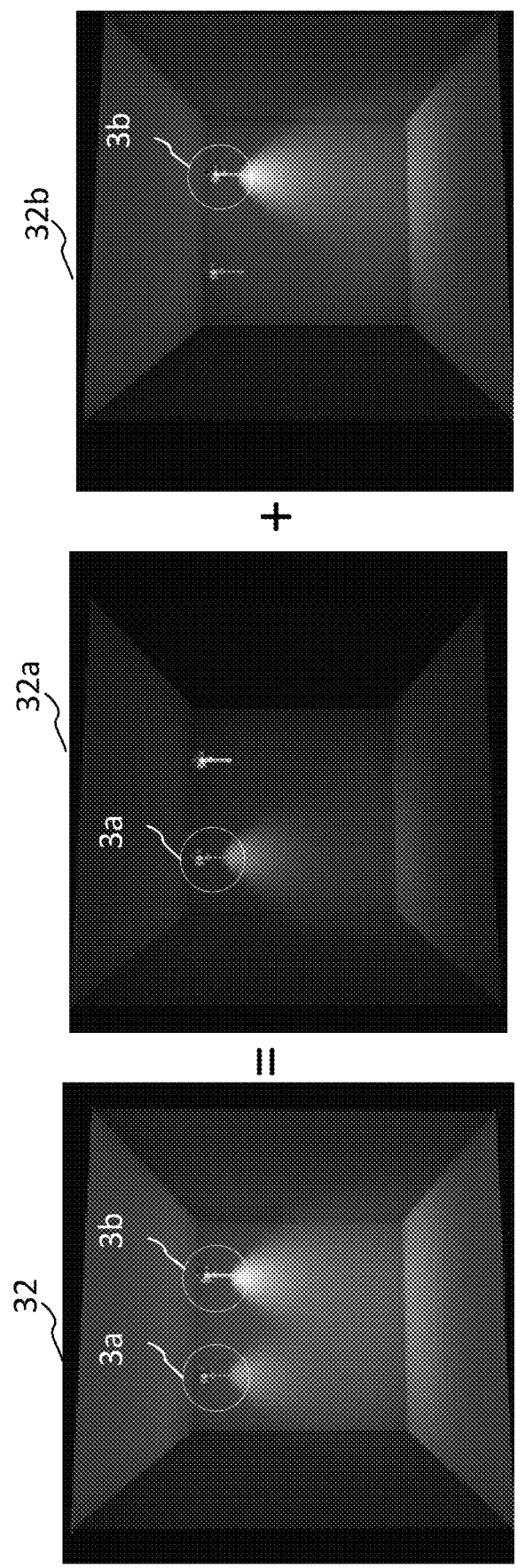
FIG. 3 is a schematic diagram of an illumination effect of a light source according to some embodiments.
Figure 4:
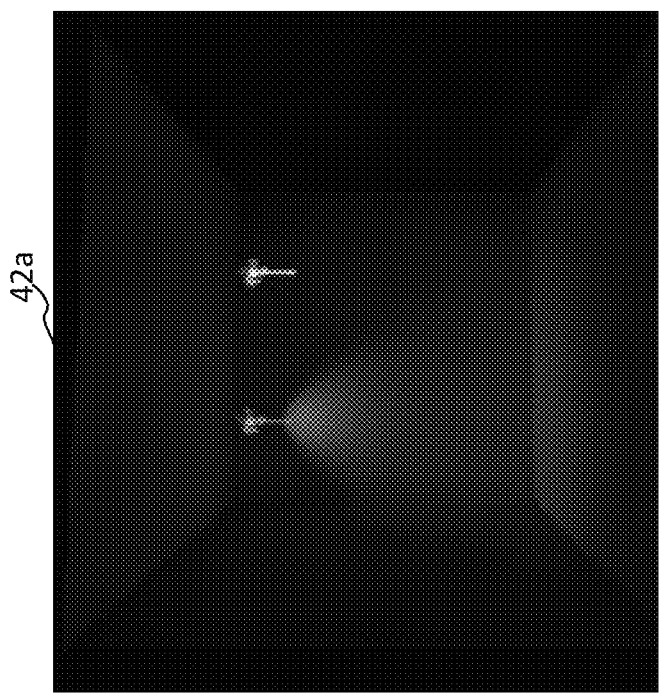
FIG. 4 is a schematic diagram of an illumination effect of a light source according to some embodiments.
Figure 4:
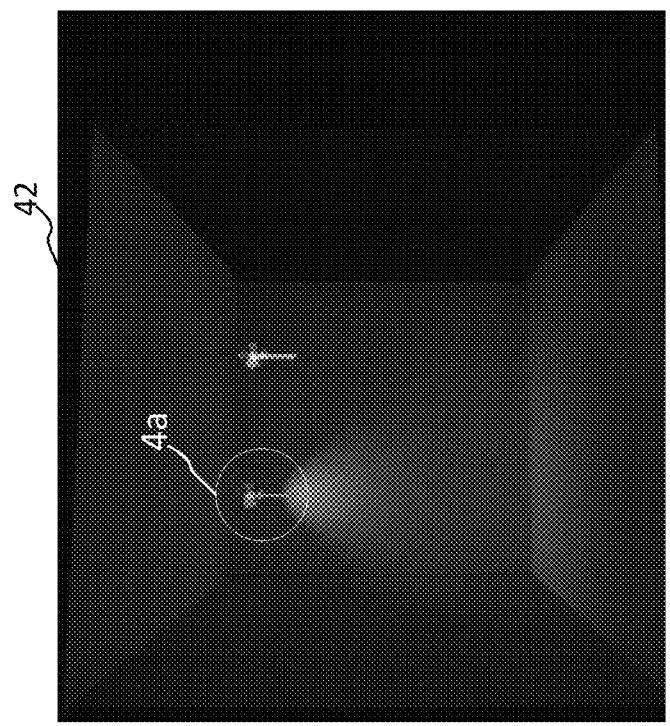

The illumination in the virtual scene is a linear system, and is an illumination effect produced by a linear combination of light sources, or a linear combination of illumination effects of an individual light source. In some embodiments, as shown in FIG. 3, a diagram 32 includes a light source 3*a* and a light source 3*b*, a diagram 32*a* includes the light source 3*a*, and a diagram 32*b* includes the light source 3*b*. The illumination effect in the diagram 32 is the effect of illumination superposition of the diagram 32*a* and the diagram 32*b*. As shown in FIG. 4, a diagram 42 includes a light source 4*a*, and a diagram 42*a* includes half the brightness of the light source 4*a*. The illumination effect in the diagram 42 is twice the illumination effect in the diagram 42*a*. The illumination effect in the diagram 32 is obtained by linearly combining the illumination effect of the light source 3*a* in the diagram 32*a* and the illumination effect of the light source 3*b* in the diagram 32*b* respectively according to the corresponding light source projection coefficient.

When the terminal detects that the light source in the virtual scene changes, the terminal updates the illumination in the current virtual scene according to the light source change information of the changed light source. Specifically, the terminal updates illumination data corresponding to a target pixel point in the virtual scene according to the light source change information. That is, when the light source changes, the terminal needs to recalculate the current light source projection coefficient corresponding to the current light source in the virtual scene according to the light source change information.

S206: Determine an indirect illumination value of a target pixel point in the virtual scene according to a radiance transfer parameter corresponding to the target pixel point in the virtual scene and the current light source projection coefficient.

The pixel point may refer to a center position of a pixel. The pixel may be a region in the form of a small square. One small square can correspond to one pixel, and a center of the pixel is the pixel point. An image is made up by a plurality of pixels.

A three-dimensional virtual scene needs to go through a series of rendering, to have its content presented on the screen in a two-dimensional form. A three-dimensional virtual scene may be displayed through successive scene screen images, and the scene screen image is made up by a plurality of pixel points.

The target pixel point refers to a pixel point corresponding to a to-be-rendered image in the virtual scene, that is, a pixel point that currently needs to be rendered. Pixel information, such as a color value, a brightness value, and a depth value, of the target pixel point can be determined according to scene data in the virtual scene. For example, the brightness value and the color value of the target pixel point are related to light intensity, a quantity of surrounding virtual objects that occlude light, and the like of the environment in which the target pixel point is located.

The radiance transfer parameter may include a radiance transfer vector. The radiance transfer vector is a vector used for converting incident light into transferred incident light including self-occlusion and mutual reflection, and may be specifically used for determining radiance per unit area.

After the light source is projected to the virtual environment, a global illumination effect may be generated. The global illumination is a special term in three-dimensional software, and light has the properties of reflection and refraction. In a real natural environment, during the day, sunlight that hits the ground has been reflected and refracted countless times, so that the ground seen by the human eyes is clear. In three-dimensional software, the global illumination not only can calculate a bright side and a dark side of an object, but also can calculate various light effects, such as reflection and refraction, of light in the virtual environment.

Light received by a surface of an object in the reality is not all from the light source, and further includes light reflected by other objects. Illumination from the light source is direct illumination, and the illumination from another object is indirect illumination. The global illumination effect includes direct illumination and indirect illumination effects. That is, global illumination=direct illumination+indirect illumination.

The direct illumination refers to brightness of a light source directly irradiated to an object and reflected to a virtual observation point or camera. The indirect illumination refers to brightness of light first irradiated by the light source to another object, finally arriving at a surface of an observed object after one or more ejections, and then reflected to a virtual observation point or camera.

The illumination brightness refers to light intensity, that is, radiance per unit projected area. The unit projected area is a plane perpendicular to illumination, and the radiant flux per unit area is referred to as radiance. The radiant flux represents a total amount of energy of light flowing through a specific region per second. Light with the same energy irradiating object surfaces with different areas has different brightness. An angle of an object surface may cause incident light to spread out, thereby reducing the radiance.

The direct illumination value refers to a color value of an object in the virtual environment after receiving direct illumination of the light source, that is, a light intensity value. Likewise, the indirect illumination value refers to a color value of an object in the virtual environment after receiving indirect illumination.

After determining a current light source projection coefficient corresponding to the changed light source according to the light source change information, the terminal determines an indirect illumination value of a target pixel point in the virtual scene according to a radiance transfer parameter corresponding to the target pixel point and the current light source projection coefficient.

Specifically, before rendering the target pixel point, the terminal can precompute radiance transfer parameters corresponding to objects in the virtual scene, specifically including radiance transfer parameter corresponding to static objects in the virtual scene and a radiance transfer parameter corresponding to a light probe.

The indirect illumination value of the target pixel point in the virtual scene may be directly calculated by using the radiance transfer parameter and the current light source projection coefficient.

S208: Determine a direct illumination value corresponding to the target pixel point under the changed light source.

When the light source in the virtual environment changes, the brightness of the direct illumination received by objects in the virtual environment may also change. The direct illumination and shadow in the virtual scene can be dynamically calculated by using the rendering pipeline of the runtime, so as to calculate the direct illumination in real time.

Specifically, the terminal may determine, according to the light source change information, the brightness of light irradiated by the changed light source to the target pixel point, and calculate, in real time, a direct illumination value corresponding to the target pixel point under the changed light source according to the changed light brightness, an object color corresponding to the target pixel point, and an angle between the target pixel point and a virtual observation point. Specifically, the brightness contribution of light of the changed light source after the light is projected to the target pixel point is calculated in a presetting manner, and used as a color value of the pixel, so as to obtain a direct illumination value corresponding to the target pixel point under the changed light source.

When the light source is not directly irradiated to the target pixel point, the direct illumination value corresponding to the target pixel point may be zero, that is, the target pixel point only includes an indirect illumination value of light irradiated by the light source to the virtual environment after the light is reflected a plurality of times. A plurality of to-be-rendered target pixel points are included, and each pixel point may include only a direct illumination value or an indirect illumination value, or may include both a direct illumination value and an indirect illumination value. When the direct illumination value is an effective value, the indirect illumination value may be zero. When the indirect illumination value is an effective value, the direct illumination value may be zero.

In some embodiments, the terminal also determines shadows corresponding to target pixel points according to the direct illumination value corresponding to the target pixel point. Specific, for calculation of a shadow value, that is, for each pixel point, a ray is emitted to the light source, if the ray intersects an object, the object is in a shadow, the shadow value is 0, if the ray does not intersect the object, the shadow value is 1, and for a case that there is a penumbra on an edge of a shadow, the shadow value ranges from 0 to 1.

S210: Perform illumination rendering on the target pixel point according to the direct illumination value and the indirect illumination value.

The illumination rendering refers to illumination calculation processing in a process of rendering a target pixel point in a to-be-rendered image, so that the final target pixel point has an illumination effect.

Direct illumination values and indirect illumination values of target pixel points in the virtual environment are calculated, to obtain global illumination information of the target pixel points in the virtual environment.

Specifically, after calculating a direct illumination value and an indirect illumination value corresponding to a to-be-rendered target pixel point, the terminal performs illumination rendering on the target pixel point according to direct illumination values and indirect illumination values corresponding to target pixel points, to obtain a final screen rendering result.

In the foregoing illumination rendering method, when a light source in the virtual scene changes, the terminal first determines light source change information, and then, determines a current light source projection coefficient corresponding to the changed light source according to the light source change information, so as to accurately and effectively update the current light source projection coefficient corresponding to the current light source in real time. The terminal further determines the indirect illumination value of a target pixel point in the virtual scene according to the current light source projection coefficient and the radiance transfer parameter corresponding to the target pixel point, so as to accurately calculate an indirect illumination value of the target pixel point under the changed light source. The terminal further determines a direct illumination value corresponding to the target pixel point under the changed light source, and performs illumination rendering on the target pixel point according to the direct illumination value and the indirect illumination value, so as to accurately and efficiently perform illumination rendering processing on the changed light source in real time, thereby effectively improving the illumination rendering effect in a dynamic illumination scene.

In some embodiments, the determining a current light source projection coefficient corresponding to the changed light source according to the light source change information includes: determining an illumination transform matrix according to the light source change information; determining an initial light source projection coefficient in the virtual scene before the light source changes; and determining the current light source projection coefficient corresponding to the changed light source according to the illumination transform matrix and the initial light source projection coefficient.

When the light source changes, the corresponding light source projection coefficient also changes accordingly. The light source change information corresponding to the light source change is specifically determined according to a difference between the changed light source and the light source before the change.

The transform matrix is linear algebra indicating that a linear transform can be performed. Any linear transform can be represented by a matrix in a consistent form for easy calculation, and a plurality of transforms can also be easily connected together through matrix multiplication. For example, in three-dimensional computer graphics, for the affine transform and perspective projection in projected space, homogeneous coordinates can be used to represent multidimensional linear transforms.

The illumination transform matrix refers to a transform matrix used to represent a light change. The initial light source projection coefficient refers to a light source projection coefficient corresponding to the light source before the light source changes.

Specifically, after determining the light source change information, the terminal first updates the illumination transform matrix after the light source changes according to the light source change information. The terminal obtains a corresponding initial light source projection coefficient before the light source changes, and further calculates the current light source projection coefficient corresponding to the changed light source according to the updated illumination transform matrix and the initial light source projection coefficient. In this way, the current light source projection coefficient corresponding to the current light source in the virtual scene can be calculated in real time, so that the light source projection coefficient under the dynamic light source can be quickly updated.

In this embodiment, the current light source projection coefficient corresponding to the changed light source is determined according to the illumination transform matrix and the initial light source projection coefficient, so that the current light source projection coefficient corresponding to the current light source in the virtual scene can be calculated in real time, so that the light source projection coefficient under the dynamic light source can be quickly updated.

In some embodiments, the light source change information is change information generated by the changed light source relative to an original light source preset in the virtual scene. The determining an initial light source projection coefficient in the virtual scene before the light source changes includes obtaining the initial light source projection coefficient obtained by projecting the original light source to a projection basis function. The determining the current light source projection coefficient corresponding to the changed light source according to the illumination transform matrix and the initial light source projection coefficient includes updating the initial light source projection coefficient according to the illumination transform matrix, to obtain the current light source projection coefficient corresponding to the changed light source.

The original light source preset in the virtual scene is a fixed original light source preset in the virtual scene before the virtual scene is displayed. The preset original light source does not change.

In mathematics, the basis function is an element of a particular base in the function space. In the function space, each successive function can be represented as a linear combination of basis functions. The basis function is also referred to as a blend function, and basis functions can be blended as an interpolation function. The projection basis function refers to inputting a light source into a basis function to calculate the reflection of light source light through the basis function.

In some embodiments, the projection basis function may be specifically a spherical harmonic function. The spherical harmonic function is to limit a harmonic function satisfying the Laplace equation to a unit sphere under a spherical coordinate system, and can be used to represent the directional distribution on the spherical surface. In graphics, the spherical harmonic function is a generalized Fourier transform defined on a sphere, can parameterize a discrete spherical function, to simulate low-frequency ambient light illumination, and for example, is used to represent a direction-related function such as a bidirectional reflection distribution (BRDF) function of a surface of an object in the virtual scene, an environment texture function, a light transmission function, and a visibility distribution function. The spherical harmonic function may be used to capture illumination, and then perform re-illumination processing to calculate global illumination in the virtual environment in real time. In other embodiments, for the projection basis function, a spherical Gaussian function, a custom piecewise function, or the like may also be used as a projection basis function, which is not limited in this application.

The light source in the virtual scene has a corresponding light source function. Projecting the light source to the projection basis function is projecting the light source function to a preset projection basis function.

The light source is projected to the projection basis function, so that for each point on the surface, light rays incident in all directions contribute to the illumination brightness at the point. To calculate the final outgoing light intensity of a single point, a lot of light rays need to be sampled. A specific solution rendering equation can be regarded as an integral on a hemispherical surface.

When a light source in the virtual scene changes, the terminal compares the changed light source with an original light source preset in the virtual scene, to obtain the light source change information. Then, the terminal obtains an initial light source projection coefficient corresponding to the original light source. The initial light source projection coefficient is a projection coefficient obtained by projecting the original light source to a projection basis function.

The terminal determines a corresponding illumination transform matrix according to the light source change information, and further updates the initial light source projection coefficient according to the illumination transform matrix. Specifically, the terminal can perform dot product processing on the illumination transform matrix and the initial light source projection coefficient, to obtain the updated projection coefficient. The terminal uses the obtained updated projection coefficient as the current light source projection coefficient corresponding to the changed light source in the virtual scene, and therefore, can quickly calculate the current light source projection coefficient corresponding to the current light source in real time.

In this embodiment, the initial light source projection coefficient is updated according to the illumination transform matrix, to obtain the current light source projection coefficient corresponding to the changed light source, and the obtained updated projection coefficient is used as a current light source projection coefficient corresponding to the changed light source in the virtual scene, so that the current light source projection coefficient corresponding to the current light source can be quickly calculated in real time.

In some embodiments, the light source change information is change information generated by the changed light source relative to a historical light source before the change in the virtual scene. The determining an initial light source projection coefficient in the virtual scene before the light source changes includes obtaining a historical light source projection coefficient corresponding to the historical light source. The determining the current light source projection coefficient corresponding to the changed light source according to the illumination transform matrix and the initial light source projection coefficient includes updating the historical light source projection coefficient according to the illumination transform matrix, to obtain the current light source projection coefficient corresponding to the changed light source.

The historical light source refers to a light source before the change. For example, if the light source of the current moment changes relative to the light source of the previous moment, the light source of the current moment is the changed light source, and the light source of the previous moment is the light source before the change, that is, the light source of the previous moment is the historical light source. The historical light source projection coefficient is a light source projection coefficient that has been calculated and that corresponds to the historical light source, and may be specifically a light source projection coefficient obtained by projecting the historical light source to a projection basis function.

When a light source in the virtual scene changes, the terminal compares the changed light source with a historical light source before the change in the virtual scene, to obtain the light source change information. The terminal then directly obtains a historical light source projection coefficient that has been calculated and that corresponds to the historical light source.

The terminal further determines a corresponding illumination transform matrix according to the light source change information, and updates the historical light source projection coefficient according to the illumination transform matrix. Specifically, the terminal can perform dot product processing on the illumination transform matrix and the historical light source projection coefficient, which is similar to performing a transform on the matrix and the vector (a set of projection coefficients), to obtain the updated projection coefficient. The terminal uses the obtained updated projection coefficient as the current light source projection coefficient corresponding to the changed light source in the virtual scene.

In this embodiment, the historical light source projection coefficient before the change is updated in real time, to accurately and effectively update the historical light source projection coefficient of the previous moment, thereby accurately calculating illumination information after the light source change in real time.

In some embodiments, steps for obtaining a radiance transfer parameter corresponding to a target pixel point in the virtual scene are as follows: obtaining, for a target pixel point belonging to a static object in the virtual scene, a lightmap matching the target pixel point; and obtaining the radiance transfer parameter corresponding to the target pixel point in the virtual scene from the lightmap.

The static object in the virtual scene refers to a fixed object in the virtual scene, and its position and direction do not change.

The lightmap refers to pre-generating a picture of illumination information for a static target object in the virtual scene by using the global illumination algorithm, and is used to represent an illumination visual effect of the static object. The lightmap is similar to color rendering. The illumination rendering is used for perform illumination rendering processing on a corresponding static object, to render a corresponding illumination effect, thereby simulating impact of illumination on an object in a real scene.

The lightmap includes illumination information, that is, pixel values or color values, corresponding to a plurality of texels. The texel, the abbreviation of a texture element, is a basic unit in the texture space of computer graphics, and the texel can be mapped to an appropriate output image pixel through the texture mapping technology. The texel in the embodiments of this application corresponds to the pixel, that is, a texel in the lightmap corresponds to a pixel point on a static object surface. The illumination rendering can be performed on an object using the illumination information of the pixel point.

Specifically, one lightmap may correspond to an object surface map corresponding to one static object in the virtual scene. In other embodiments, one lightmap may correspond to one or more static objects in the virtual scene, for example, may be a plurality of object surface maps on the same plane. By using the lightmap technology, illumination information can be generated offline for a drawn object rendered in real time, to improving the screen quality while ensuring the performance.

A precomputed radiance transfer parameter corresponding to the texel of the static object in the virtual scene is stored in the lightmap corresponding to the static object. For example, specifically, the radiance transfer parameter corresponding to the static object can be precomputed based on the precomputed radiance transfer (PRT)-based drawing technology, and then, the radiance transfer parameter is stored in the corresponding lightmap. Therefore, when calculating the indirect illumination value of the static object, the terminal can directly obtain the corresponding radiance transfer parameter from the lightmap for illumination calculation processing.

When a light source in the virtual scene changes, after determining the current light source projection coefficient corresponding to the changed light source according to the light source change information of the changed light source, the terminal obtains a precomputed radiance transfer parameter corresponding to the target pixel point, to calculate indirect illumination value of the target pixel point in the virtual scene according to the radiance transfer parameter and the current light source projection coefficient.

Specifically, when the to-be-rendered target pixel point includes the target pixel point of the static object in the virtual scene, for the target pixel point belonging to the static object in the virtual scene, the terminal obtains the radiance transfer parameter corresponding to the target pixel point from the lightmap matching the target pixel point. Then, the terminal calculates the indirect illumination value of the target pixel point in the virtual scene according to the current light source projection coefficient and the obtained radiance transfer parameter.

In this embodiment, the radiance transfer parameter corresponding to the static object in the virtual scene is pre-baked and stored in the corresponding lightmap. Therefore, when calculating the indirect illumination value of the static object, the terminal can directly obtain the corresponding radiance transfer parameter from the lightmap for illumination calculation processing. Therefore, the efficiency of obtaining the radiance transfer parameter is improved, so that the indirect illumination value of the static object can be calculated accurately and quickly, thereby improving the efficiency of illumination rendering.

In some embodiments, the obtaining the radiance transfer parameter corresponding to the target pixel point in the virtual scene from the lightmap includes: searching, for a target pixel point belonging to a static object in the virtual scene, a lightmap of the static object based on a texture mapping relationship for a texel matching the target pixel point; and obtaining the radiance transfer parameter corresponding to the target pixel point from the lightmap according to the matching texel.

The texture mapping is a process of mapping texels in a texture space to pixels in a screen space. The texture mapping relationship is a mapping relationship between the texels in the texture space and the pixels in the screen space. Through texture mapping, an image can be attached to surfaces of a three-dimensional object to enhance the sense of reality. The texture mapping can be combined with technologies such as illumination calculation and image blending, to form many very beautiful effects.

Specifically, in a process of calculating an indirect illumination value of a target pixel point belonging to a static object in the virtual scene, for each target pixel point, the terminal first obtains a lightmap corresponding to the static object, and then, searches, according to a texture mapping relationship, a lightmap corresponding to the static object for a texel matching the target pixel point. The texel of the static object in the lightmap corresponds to the pixel point on a surface of the static object.

Then, the terminal obtains, according to the matching texel, a radiance transfer parameter that is pre-stored and that corresponds to each target pixel point from the lightmap. The terminal further performs dot product processing on the current light source projection coefficient and a radiance transfer parameter corresponding to each target pixel point, to calculate an indirect illumination value of the target pixel point in the virtual scene.

In this embodiment, radiance transfer parameters of static objects in the virtual scene are pre-baked and stored in corresponding lightmaps. Therefore, when the virtual scene is run, the efficiency of obtaining the radiance transfer parameter is improved, the indirect illumination value of the static object can be quickly calculated in real time, the efficiency of illumination rendering is improved, and the indirect illumination value of the static object after the light source change can be accurately and quickly calculated.

In some embodiments, steps for obtaining a radiance transfer parameter corresponding to a target pixel point in the virtual scene are as follows: obtaining, for a target pixel point belonging to a dynamic object in the virtual scene, a light probe matching the target pixel point; and obtaining the radiance transfer parameter corresponding to the target pixel point in the virtual scene from the light probe.

The dynamic object in the virtual scene refers to a non-fixed object in the virtual scene, that is, may be a mobile object that moves in the virtual scene, and at least one of a position, a direction, or the like of the dynamic object is changeable.

The light probe is a light detector placed in the virtual scene in advance, and may be specifically a sphere or a polygon, for example, a cube. The light probe can capture and use relevant information of a ray passing through a blank space in the scene, and can be configured to provide high-quality illumination information including indirect reflected light for a dynamic object in the virtual scene, and provide high-precision detailed illumination information for a static object.

Similar to the lightmap, the light probe stores baking information of the illumination in the virtual scene, including a precomputed radiance transfer parameter. The difference lies in that: the lightmap stores the illumination information related to a ray irradiating a surface of the static object in the virtual scene, while the light probe stores information related to a ray passing through a blank space in the scene.

Specifically, when the to-be-rendered target pixel point includes a target pixel point of a dynamic object in the virtual scene, for the target pixel point belonging to the dynamic object in the virtual scene, the terminal obtains a light probe matching the target pixel point, and obtains corresponding radiance transfer parameters from the light probes. The terminal can select a light probe matching the target pixel point from light probes in the virtual scene based on distances between the target pixel point and the light probes. For example, the terminal can calculate a distance between the target pixel point and a light probe, and when the calculated distance is less than a distance threshold, determines the light probe as a light probe matching the target pixel point. The distance threshold can be preset or set according to needs. The terminal further determines the indirect illumination value of a target pixel point in the virtual scene according to the current light source projection coefficient and the radiance transfer parameter stored in the light probe matching the target pixel point. Then, the terminal calculates the indirect illumination value of the target pixel point in the virtual scene according to the current light source projection coefficient and the obtained radiance transfer parameter.

In this embodiment, the radiance transfer parameter corresponding to the light probe in the virtual scene is pre-baked and stored in the corresponding light probe. Therefore, when calculating the indirect illumination value of the dynamic object, the terminal can directly obtain the corresponding radiance transfer parameter from the light probe for illumination calculation processing. The efficiency of obtaining the radiance transfer parameter is improved, so that the indirect illumination value of the dynamic object can be calculated accurately and quickly, thereby improving the efficiency of illumination rendering.

In some embodiments, the determining an indirect illumination value of a target pixel point in the virtual scene according to a radiance transfer parameter corresponding to the target pixel point in the virtual scene and the current light source projection coefficient includes: updating light brightness corresponding to directions on the light probe according to the current light source projection coefficient and the radiance transfer parameter; performing interpolation on the updated light brightness corresponding to the light probe; determining the indirect illumination value of the target pixel point in the virtual scene according to the light brightness after the interpolation and a normal direction of the target pixel point.

There are a plurality of directions on the light probe, and there is a pre-baked corresponding light brightness in each direction. That is, for each direction on the light probe, a radiance transfer parameter corresponding to the direction is precomputed.

The normal refers to a straight line that is always perpendicular to a plane. In geometry, the normal refers to a line that is perpendicular to a tangent at a point of a curve on a plane. For a solid surface, the normal has a direction, generally, a direction of pointing to the outside from the inside of the solid is a normal positive direction, and otherwise, it is a normal negative direction. In this embodiment, the normal direction of the target pixel point refers to a direction of pointing to a normal of the virtual observation point or the camera from the target pixel point.

Specifically, in a process of calculating an indirect illumination value of a target pixel point belonging to a dynamic object in the virtual scene, for each target pixel point, the terminal first obtains light probes corresponding to the dynamic object, for example, may obtain light probes within a preset distance of the dynamic object, and then, obtains radiance transfer parameters stored in light probes. The terminal then calculates a light brightness in each direction of each light probe according to the radiance transfer parameters stored in the light probes and current projection coefficients corresponding to the probe surfaces. Specifically, the calculated light brightness may be the indirect illumination value.

Further, the terminal then performs interpolation on the light brightness corresponding to the light probe matching the dynamic object, to obtain a light brightness after the interpolation. The terminal then calculates the indirect illumination value corresponding to the target pixel point on the dynamic object according to the normal direction of the target pixel point on the dynamic object, so as to accurately calculate the indirect illumination value of each target pixel point in the virtual scene.

In this embodiment, radiance transfer parameters of light probes in the virtual scene are pre-baked and stored in corresponding light probes. Therefore, when the virtual scene is run, radiance transfer parameters are obtained from the light probes, so that the efficiency of obtaining the radiance transfer parameter is improved, the indirect illumination value of the dynamic object can be quickly calculated in real time, the indirect illumination value of the dynamic object after the light source change can be accurately and quickly calculated, and the efficiency of illumination rendering is improved.

In some embodiments, before the determining light source change information when a light source changes in a virtual scene, the illumination rendering method further includes: projecting an original light source to a plurality of projection basis functions, and using all the projection basis functions after the projection as corresponding virtual light sources respectively; determining, for pixel points of a static object in the virtual scene, radiance transfer parameters corresponding to the virtual light sources on the pixel points based on ray tracing, and storing the radiance transfer parameters into a corresponding lightmap; determining, for a light probe in the virtual scene, radiance transfer parameters corresponding to the virtual light sources on the light probe based on ray tracing, and storing the radiance transfer parameters into the light probe.

The ray tracing, that is, path tracing, is a technology used in computer graphics for rendering a virtual scene, and refers to tracing a ray propagation path in the virtual scene, to obtain a ray path of the ray in the propagation process. Its principle is that a ray is emitted from a viewpoint, when the ray intersects a surface of an object, a random direction is selected according to a material attribute of the surface, another ray is continuously emitted for tracing sampling, and iteration is performed in this way until the ray hits the light source or escapes from the scene. Then, a contribution of the ray is then calculated as a color value of a pixel. For example, the contribution of the ray can be calculated using the Monte Carlo method.

Therefore, provided that a quantity of iterations is sufficient and a rendering time is long enough, a final rendered image can converge, to obtain an illumination rendering result with high accuracy. The ray tracing can render a high-fidelity scene effect, but relatively requires high computational overheads.

In geometric optics, the brightness of radiation reflected by the surface of the object does not change in optical propagation, that is, the radiance transfer parameter does not change. Therefore, radiance transfer parameters of surfaces of objects in the virtual scene can be pre-baked, so that the computational overheads in the real-time rendering process can be effectively reduced, thereby improving the efficiency of rendering processing.

Before the to-be-rendered target pixel point in the virtual scene is rendered, the radiance transfer parameter corresponding to the pixel point of the static object in the virtual scene and the radiance transfer parameters corresponding to the light probe can be pre-baked. Specifically, the radiance transfer parameter can be baked based on basis function light source in the virtual scene. The basis function light source is a virtual light source. That is, after an original light source is projected to preset projection basis functions, each basis function is used as a virtual light source, and the projected basis function is the basis function light source.

The radiance transfer parameter can be pre-baked in a ray tracing manner according to projection basis function. The projection basis function may be a spherical harmonic function. Because the spherical harmonic function has the characteristics of rotation invariance and high projection performance, when a light source changes, the radiance transfer parameter does not change, only a light source projection coefficient corresponding to the light source changes with the light source. Therefore, the radiance transfer parameter can be effectively baked in the form of a spherical harmonic function based on a hemispheric surface integral.

The terminal can project an original light source to a plurality of projection basis functions, and use all the projection basis functions after the projection as corresponding virtual light sources respectively, and then calculate brightness information of the virtual light sources on surfaces of objects in the virtual scene by using ray tracing. In the process of precomputing the radiance transfer parameter, the terminal only samples the indirect illumination, that is, only samples rays that has been bounced more than twice.

Then, all the virtual light sources are projected onto the surfaces of the objects in the virtual scene, and pixel points on the surfaces of the objects in the virtual scene may receive brightness information corresponding to all the virtual light sources.

Specifically, in a process of baking the radiance transfer parameter, the terminal first projects a preset original light source to a plurality of preset different projection basis functions, for example, to three different projection basis functions. Plurality means at least two. When an original light source is projected to a plurality of projection basis functions, an approximately dynamic light source is generated, and each projection basis function after the projection is used as a virtual light source. Therefore, all the projection basis functions after the projection can be used as corresponding virtual light sources respectively. All the projection basis function after the projection are re-projected to the virtual scene as virtual light sources. Pixel points on surfaces of objects in the virtual scene can receive the brightness information of the virtual light sources, so that illumination information corresponding to the approximately dynamic light source can be sampled in the virtual scene.

After the pixel points on the surfaces of the objects in the virtual scene receive the brightness information of the virtual light sources, reflected rays are emitted from the pixel points of the objects. Then, ray tracing is performed on the reflected rays, to capture brightness contributions of the reflected ray sin the virtual scene, so as to determine radiance transfer parameters corresponding to the pixel points on the surfaces of the objects.

Specifically, the terminal can bake corresponding radiance transfer parameters for the static object and light probes in the virtual scene respectively. The terminal determines, for pixel points of a static object in the virtual scene, radiance transfer parameters corresponding to the virtual light sources on the pixel points based on ray tracing, and stores the radiance transfer parameters into a corresponding lightmap. The terminal determines, for a light probe in the virtual scene, radiance transfer parameters corresponding to the virtual light sources on the light probe based on ray tracing, and storing the radiance transfer parameters into the corresponding light probe.

In this embodiment, the radiance transfer parameters corresponding to the static object and the light probes in the virtual scene are precomputed and stored in the corresponding lightmaps and light probes respectively, so that the real-time illumination rendering process can be directly obtained. The radiance transfer parameter corresponding to the target pixel point performs indirect illumination calculation, which can effectively reduce the calculation consumption in the real-time rendering process, and effectively improve the effect of illumination rendering.

In some embodiments, the determining, for pixel points of a static object in the virtual scene, radiance transfer parameters corresponding to the virtual light sources on the pixel points based on ray tracing, and storing the radiance transfer parameters into a corresponding lightmap includes: determining, for pixel points of a static object in the virtual scene, radiance transfer parameters corresponding to the virtual light sources on the pixel points based on ray tracing, and storing the radiance transfer parameters into a corresponding lightmap; emitting, with the pixel point as a starting point, rays with the light brightness to a hemispherical surface to which a normal of the pixel point points; sampling, in the virtual scene, reflection brightness and brightness attenuations of the rays after the rays are reflected by the hemispherical surface; and determining the radiance transfer parameter corresponding to the pixel point based on the reflection brightness and the light source brightness corresponding to the rays, and storing the radiance transfer parameter to the corresponding lightmap.

The light brightness of a pixel point after an original light source is projected refers to light brightness information received by a pixel point on a static object in the virtual scene after the original light source in the virtual scene is projected to preset projection basis functions, that is, a light and dark degree of a color of the pixel point after the pixel point is irradiated by the light source.

An example in which the projection basis function is a spherical harmonic function is used. The spherical harmonic function is an orthonormal basis defined on a unit spherical surface. After the light source is projected to the projection basis functions, the projection basis functions can be used to represent directional distribution on the spherical surface. The hemispherical surface to which normals of the pixel points point are orthonormal bases on the unit hemispherical surface corresponding to the pixel points on the projection basis functions.

Specifically, when the terminal precomputes the radiance transfer parameter corresponding to the static object in the virtual scene, the virtual light sources are projected in the virtual scene, each pixel point on the static object receives light brightness corresponding to the virtual light sources, which may be specifically light brightness of the virtual light sources after a plurality of reflections.

Then, for each pixel point on the static object, the terminal emits, by using a world space position corresponding to a center of the pixel point as a starting point, rays based on the received light brightness to a hemispherical surface which a normal of the pixel point faces, that is, emits rays with light brightness The terminal then performs sampling in the virtual scene, calculates reflection brightness and brightness attenuations of rays after the rays are reflected by the hemispherical surface, and then, calculates light brightness contributions of rays after a plurality of bounces according to the reflection brightness and brightness attenuations. Specifically, when a reflected ray intersects an object in the virtual scene, a brightness contribution of the ray after a plurality of bounces is calculated on a current projection basis function. For each ray, a brightness contribution corresponding to the ray is calculated, then, the brightness contribution is fitted to the corresponding projection basis function, and then, a radiance transfer parameter on the corresponding projection basis function is calculated according to the brightness contribution.

After projecting the original light source to a plurality of projection basis function, the terminal samples, for each basis function, a brightness contributions of a ray after a plurality of bounces in the virtual scene, calculates a radiance transfer parameter on the corresponding projection basis function, and then, fits the radiance transfer parameters on the projection basis functions to obtain a final radiance transfer parameter corresponding to the pixel point.

After calculating the radiance transfer parameters corresponding to pixel points on the static object in the virtual scene, the terminal further stores the radiance transfer parameters to corresponding texel positions in the lightmap according to the texture mapping relationship.

In this embodiment, after the original light source is projected to a plurality of projection basis functions, rays are emitted from each pixel point to a hemispherical surface to which a normal of the pixel point points, and then, brightness contributions of the rays after a plurality of reflections are sampled in the virtual scene, so that radiance transfer parameters corresponding to pixel points on the static object in the virtual scene can be accurately calculated.

In some embodiments, the determining, for a light probe in the virtual scene, radiance transfer parameters corresponding to the virtual light sources on the light probe based on ray tracing, and storing the radiance transfer parameters into the light probe includes: obtaining, for the light probe in the virtual scene, light brightness corresponding to the virtual light sources on faces of the light probe after the projection; emitting, with a center point of the light probe as a starting point, rays to a spherical surface with the center point as a center and a preset radius based on the light brightness; sampling, in the virtual scene, reflection brightness and brightness attenuations of the rays after the rays are reflected by the spherical surface; and determining radiance transfer parameters corresponding to the light probe based on the reflection brightness and the brightness attenuations corresponding to the rays, and storing the radiance transfer parameters to the light probe.

A plurality of corresponding projection basis functions can be preset for each light probe, and may be specifically spherical basis functions.

When the terminal precomputes the radiance transfer parameter corresponding to the light probe in the virtual scene, the virtual light sources are projected in the virtual scene, surfaces of each light probe in a plurality of directions in the virtual scene receive light brightness corresponding to the virtual light sources. For a surface of the light probe in each direction, the terminal emits, by using a center point position of the light probe as a starting point, rays to a spherical surface with the center point as a center and a preset radius according to the light brightness received by the light probe.

For a brightness contribution of each ray, similar to a calculation manner corresponding to each pixel point on a static object, after a brightness contribution corresponding to the ray is calculated, the brightness contribution is fitted to the corresponding projection basis function, and then, a radiance transfer parameter on the corresponding projection basis function is calculated according to the brightness contribution.

Specifically, for each ray and its corresponding brightness value, an angle of the ray is calculated according to a direction of the ray and a direction of each surface on the light probe. When the angle of the ray is less than 90 degrees, the brightness contribution of the ray on the current projection basis function after a plurality of bounces is calculated. For each ray, a brightness contribution corresponding to the ray is calculated, then, the brightness contribution is fitted to a projection basis function of the corresponding surface, and then, a radiance transfer parameter on the corresponding projection basis function of the corresponding surface is calculated according to the brightness contribution.

Figure 5:
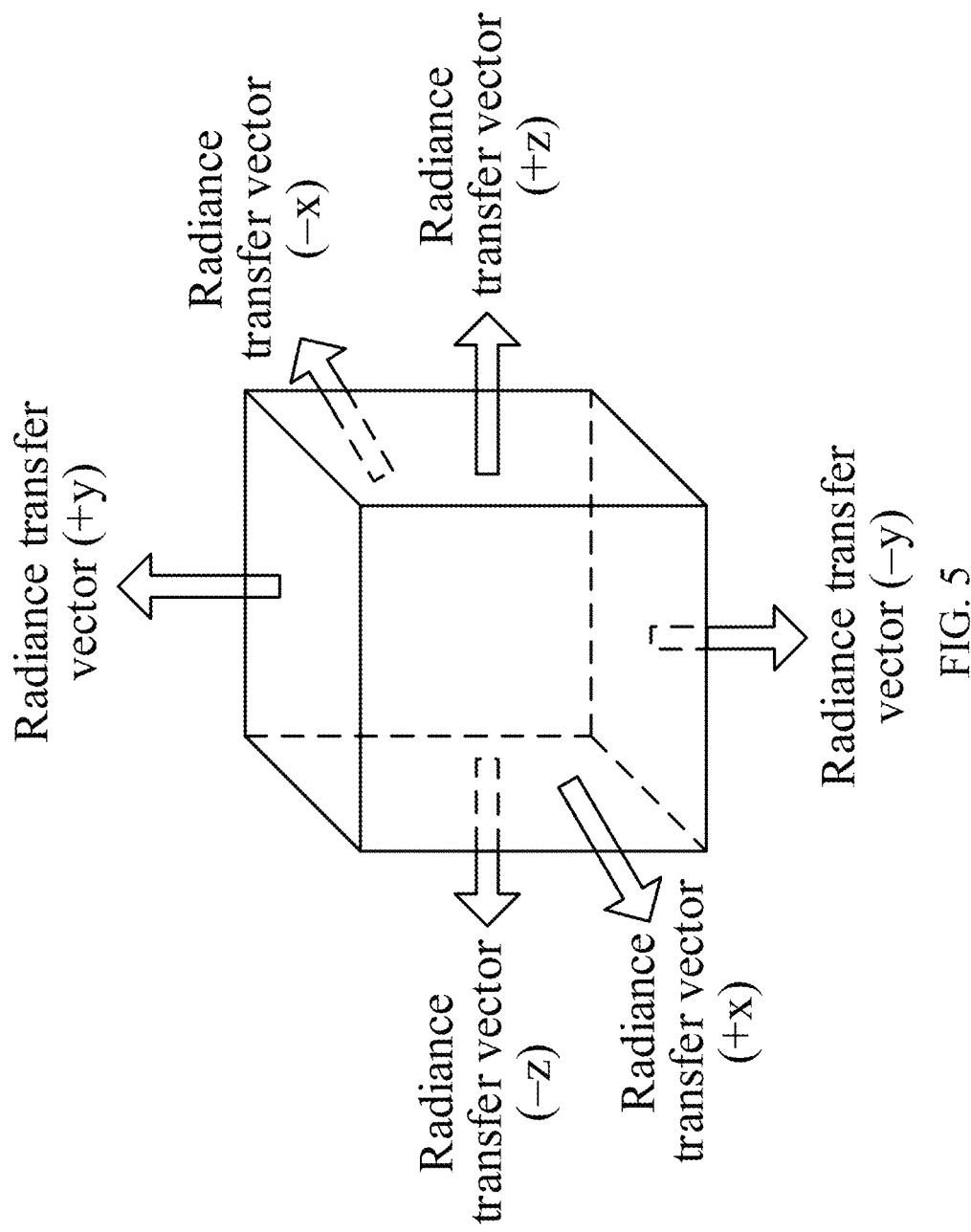
FIG. 5 is a schematic diagram of radiance transfer parameters of all surfaces corresponding to a light probe according to some embodiments.

For example, as shown in FIG. 5, using a cube as an example, for example, an ambient cube is used to represent surfaces of the light probe in a plurality of directions. The ambient cube includes six surfaces, that is, a surface x, a surface −x, a surface y, a surface −y, a surface z, and a surface −z. Each surface corresponds to one projection basis function. A corresponding radiance transfer parameter is stored on each basis function. The radiance transfer parameter may be specifically a radiance transfer vector. That is, the surface x corresponds to a radiance transfer vector (x), the surface −x corresponds to a radiance transfer vector (−x), the surface y corresponds to a radiance transfer vector (y), the surface −y corresponds to a radiance transfer vector (−y), the surface z corresponds to a radiance transfer vector (z), and the surface −z corresponds to a radiance transfer vector (−z).

After calculating the radiance transfer parameter corresponding to each surface on the light probe in the virtual scene, the terminal stores the radiance transfer parameter on the light probe.

In this embodiment, after the original light source is projected to a plurality of projection basis functions, rays are emitted from a center point of each light probe to a spherical surface, and then, brightness contributions of the rays after a plurality of reflections are sampled in the virtual scene, so that radiance transfer parameters corresponding to a plurality of surfaces of the light probe on the static object in the virtual scene can be accurately calculated.

In some embodiments, the virtual scene is a virtual game scene, and the light source in the virtual game scene is a distant light source. The determining light source change information when a light source changes in a virtual scene includes: monitoring a light source direction of the distant light source in the virtual game scene when the virtual game scene is run; determining, when the light source direction changes, the light source change information according to the changed light source direction and an initial light source direction of the distant light source.

The virtual game scene refers to a virtual scene deployed in a game application, and may be specifically a three-dimensional virtual scene. The distant light source may specifically refer to a light source with a relatively large range in the screen, that is, a light source with a relatively large distance from the object in the virtual scene, for example, the sun light or sky light in the virtual game scene. For example, the sky light in the game scene is usually scattered light in the environment calculated based on a manner of simulating atmospheric scattering, and can render the sky and scenery under different sun positions and atmospheric characteristics. Usually, the final color value is calculated by using an integral formula, and an integral interval is a continuous interval, so that an approximate result can be obtained by calculating a cumulative sum in a discrete sampling manner.

Specifically, a game application is deployed in the terminal, and the game application includes a virtual game scene. When the virtual game scene in the terminal is run, the terminal monitors a light source direction of a distant light source in the virtual game scene in real time.

When detecting that the light source direction in the virtual game scene changes, the terminal determines light source change information according to the changed light source direction and an initial light source direction of the distant light source. For example, when the light source rotates, a rotation angle of the light source is determined according to a rotation direction. Then, the terminal calculates a rotation matrix corresponding to spherical harmonics according to the rotation angle, to update the light source projection coefficient in the virtual game scene in real time according to the rotation matrix and the initial light source projection coefficient in the virtual game scene, so as to calculate a current light source projection coefficient corresponding to the to-be-displayed target pixel point, and further, performs illumination rendering processing on the target pixel point according to the current light source projection coefficient calculated in real time.

Figure 6:
FIG. 6 is a schematic diagram of a scene screen according to some embodiments.
Figure 7:
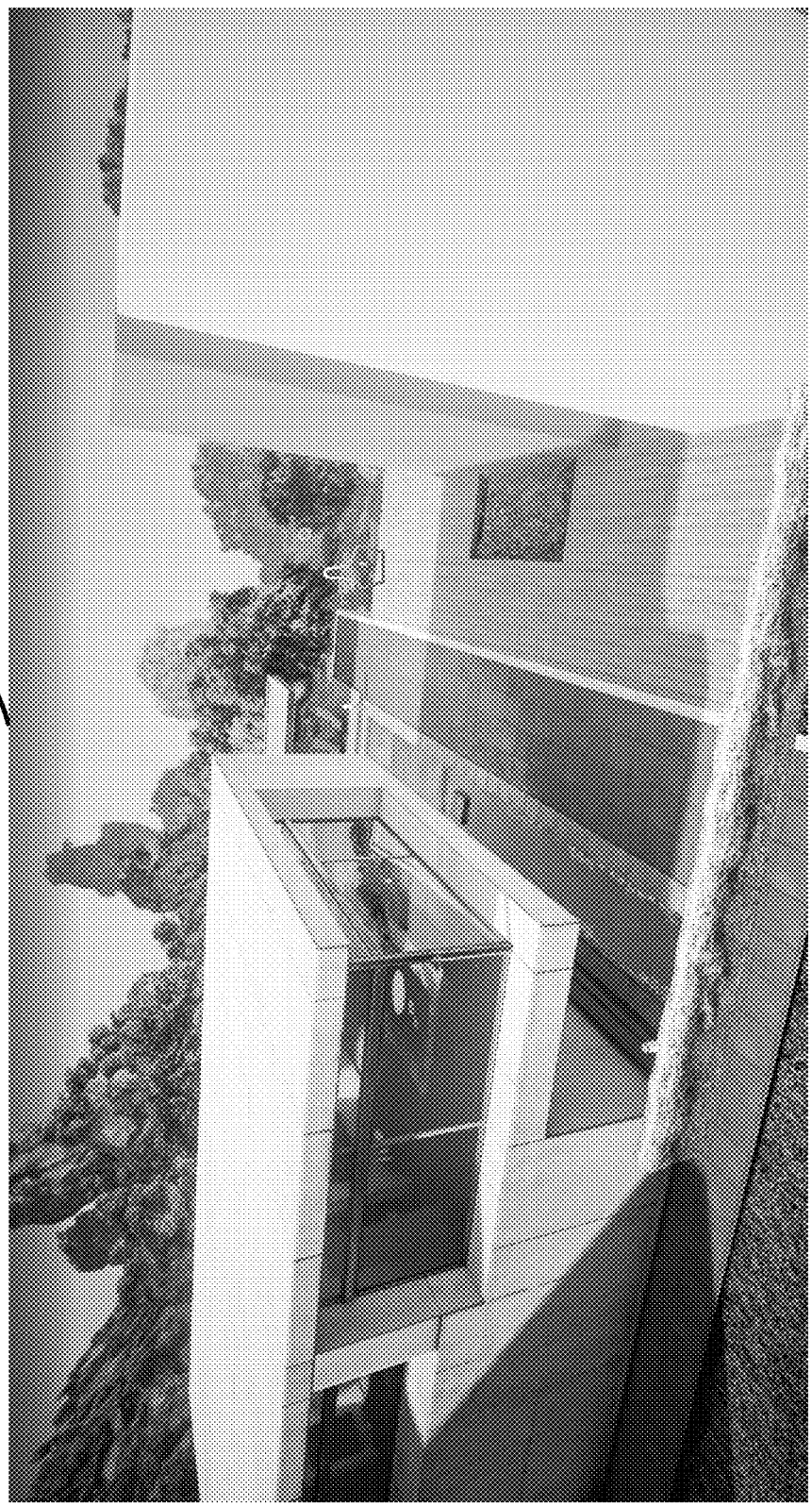
FIG. 7 is a schematic diagram after projecting a scene screen according to some embodiments.

For example, as shown in FIG. 6, which is a scene screen 6a in some embodiments, it can be seen that the distant light source in the scene screen is sunlight. There is a house on the left and two walls on the right in the virtual scene. The two walls are red and green respectively, and may reflect corresponding indirect illumination in the virtual scene. When the distant light source changes, for example, when the sunlight in the virtual scene has a rotation change, the illumination received by objects in the virtual scene also changes. FIG. 7 is a scene screen 7a after the sunlight in the virtual scene in FIG. 6 rotates. It can be seen from FIG. 7 that when the walls receive brighter light, corresponding reflected light of the wall of the house on the left is also brighter.

In this embodiment, according to the light source change information of the dynamic light source in the virtual game scene, the light source projection coefficient in the scene is updated in real time, so as to dynamically calculate a direct illumination value and an indirect illumination value in the virtual game scene. Therefore, real-time dynamic illumination rendering can be performed on the scene with the dynamic change of the light source, so that an effect close to the real natural environment can be presented, thereby effectively improving the illumination rendering effect under the dynamic light source in the virtual scene.

Figure 8:
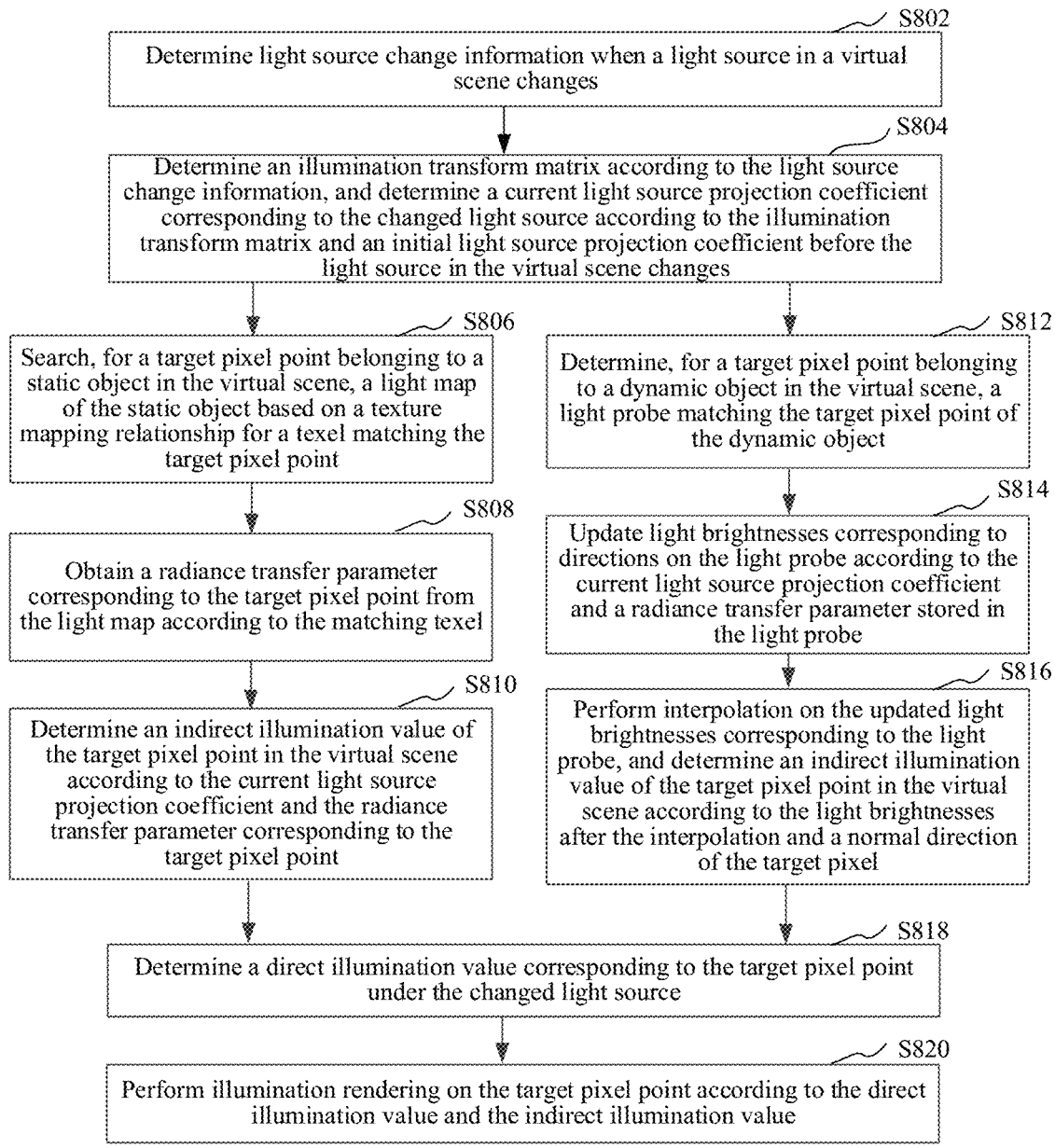
FIG. 8 is a schematic diagram of an illumination rendering method according to some specific embodiments.

In a specific embodiment, as shown in FIG. 8, a specific illumination rendering method is provided, specifically including the following steps:

S802: Determine light source change information when a light source changes in a virtual scene.

S804: Determine an illumination transform matrix according to the light source change information, and determine a current light source projection coefficient corresponding to the changed light source according to the illumination transform matrix and an initial light source projection coefficient before the light source in the virtual scene changes.

S806: Search, for a target pixel point belonging to a static object in the virtual scene, a lightmap of the static object based on a texture mapping relationship for a texel matching the target pixel point.

S808: Obtain a radiance transfer parameter corresponding to the target pixel point from the lightmap according to the matching texel.

S810: Determine an indirect illumination value of the target pixel point in the virtual scene according to the current light source projection coefficient and the radiance transfer parameter corresponding to the target pixel point.

S812: Determine, for a target pixel point belonging to a dynamic object in the virtual scene, a light probe matching the target pixel point of the dynamic object.

S814: Update light brightness corresponding to directions on the light probe according to the current light source projection coefficient and a radiance transfer parameter stored in the light probe.

S816: Perform interpolation on the updated light brightness corresponding to the light probe, and determine an indirect illumination value of the target pixel point in the virtual scene according to the light brightness after the interpolation and a normal direction of the target pixel point.

S818: Determine a direct illumination value corresponding to the target pixel point under the changed light source.

S820: Perform illumination rendering on the target pixel point according to the direct illumination value and the indirect illumination value.

In a process of displaying a virtual scene or running an application including a virtual scene by the terminal, when the terminal detects that a light source in the virtual scene changes, a light source projection coefficient corresponding to the changed light source also changes accordingly. The terminal determines an illumination transform matrix according to the light source change information, for example, determine the light source rotation matrix according to an angle by which the light source changes. The terminal the determines a current light source projection coefficient corresponding to a current light source in the virtual scene according to the illumination transform matrix and an initial light source projection coefficient before the light source changes.

The illumination in the virtual scene is a linear system, the light source in the virtual scene can be represented by a function, and the illumination in the virtual scene is calculated by projecting the light source function to the light source projection basis function.

Specifically, an expression of the illumination linear system may be as follows:

$$f(ax+by+cz+\ldots) = sf(x)+bf(y)+cf(z)+\ldots = (f(x)f(y)f(z)\ldots)\begin{pmatrix} a \\ b \\ c \\ \ldots \end{pmatrix}$$

where x, y, and z are basis functions to which a light source in a virtual scene is projected, and a, b, and c are light source projection coefficients of the light source projected to the basis functions.

For example, a distant light source can be represented by using a cubemap in the virtual scene, to be projected to the basis functions during illumination calculation. A projection expression of the distant light source may be:

(sh0,sh1,sh2 ... )=(x,y,z ... )=a*sh0+b*sh1+ c*sh2+ ...

where sh0, sh1, and sh2 are basis functions, and respectively correspond x, y, and z. After the light source is projected, illumination on the virtual scene is an approximate effect, and may be used for smooth illumination such as indirect illumination. When the light source rotates, the basis functions do not change and only corresponding light source projection coefficients a, b, and c change. Therefore, f(x), f(y), and f(z) in the foregoing formula do not change. Specifically, corresponding radiance transfer parameters Transfer Vector can be calculated in a pre-baking manner, while light source projection coefficients a, b, and c need to calculated according to the corresponding light source in the virtual scene during real-time running.

In actual applications, the spherical harmonic basis function of any order can be used to fit the light source according to application requirements. The higher the order, the more accurate the fitting of the complex light source, but the higher the order, the more the to-be-consumed computational resource. In this embodiment, only baking indirect illumination based on the PRT technology is considered. Specifically, a third-order spherical harmonic basis function, that is, 9 basis functions, or the fourth-order spherical harmonic basis function, that is, 16 basis functions, can be used, to satisfy the fitting requirement of the distant light source.

Figure 9:
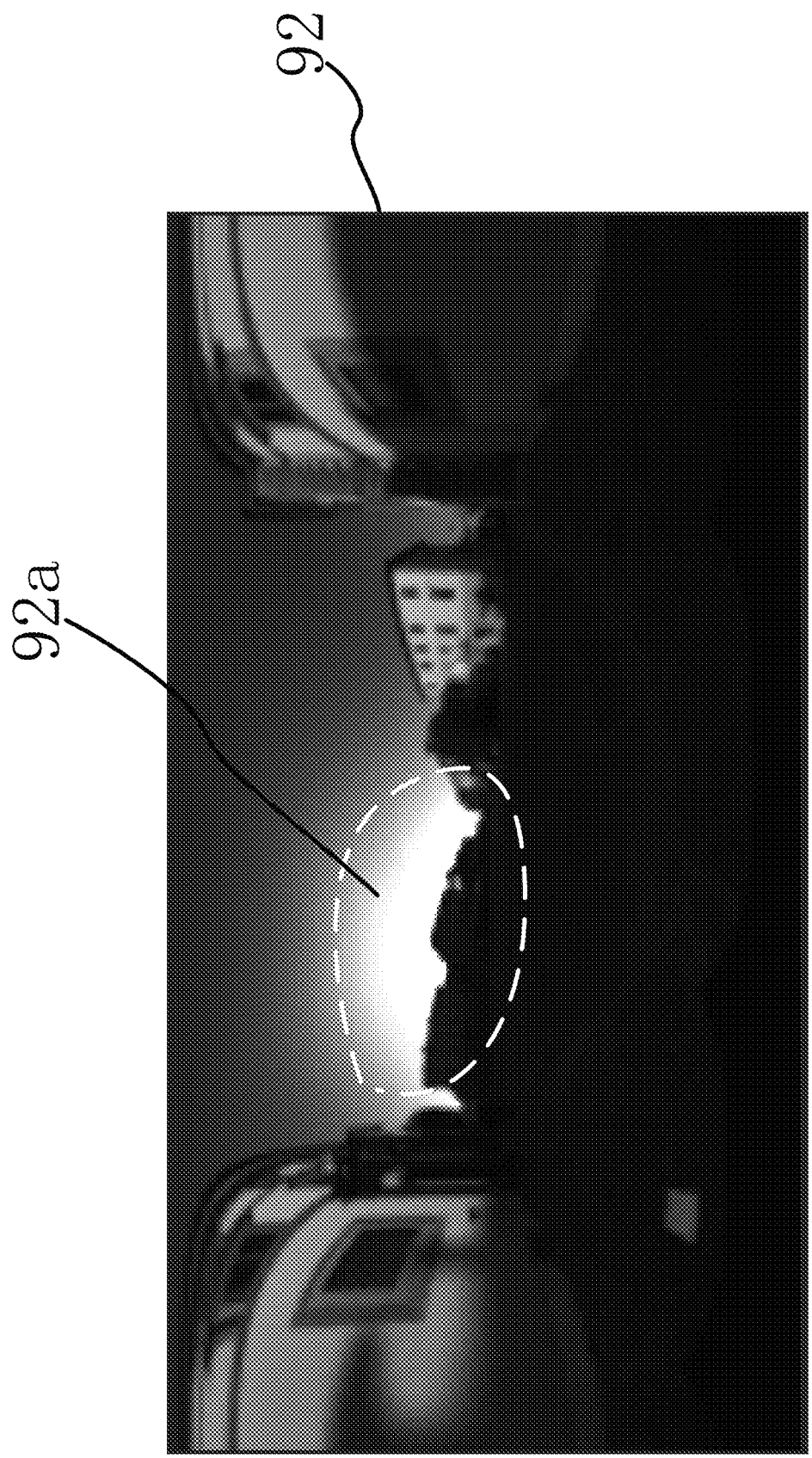
FIG. 9 is a schematic diagram of an effect of rendering a scene screen according to some embodiments.
Figure 10:
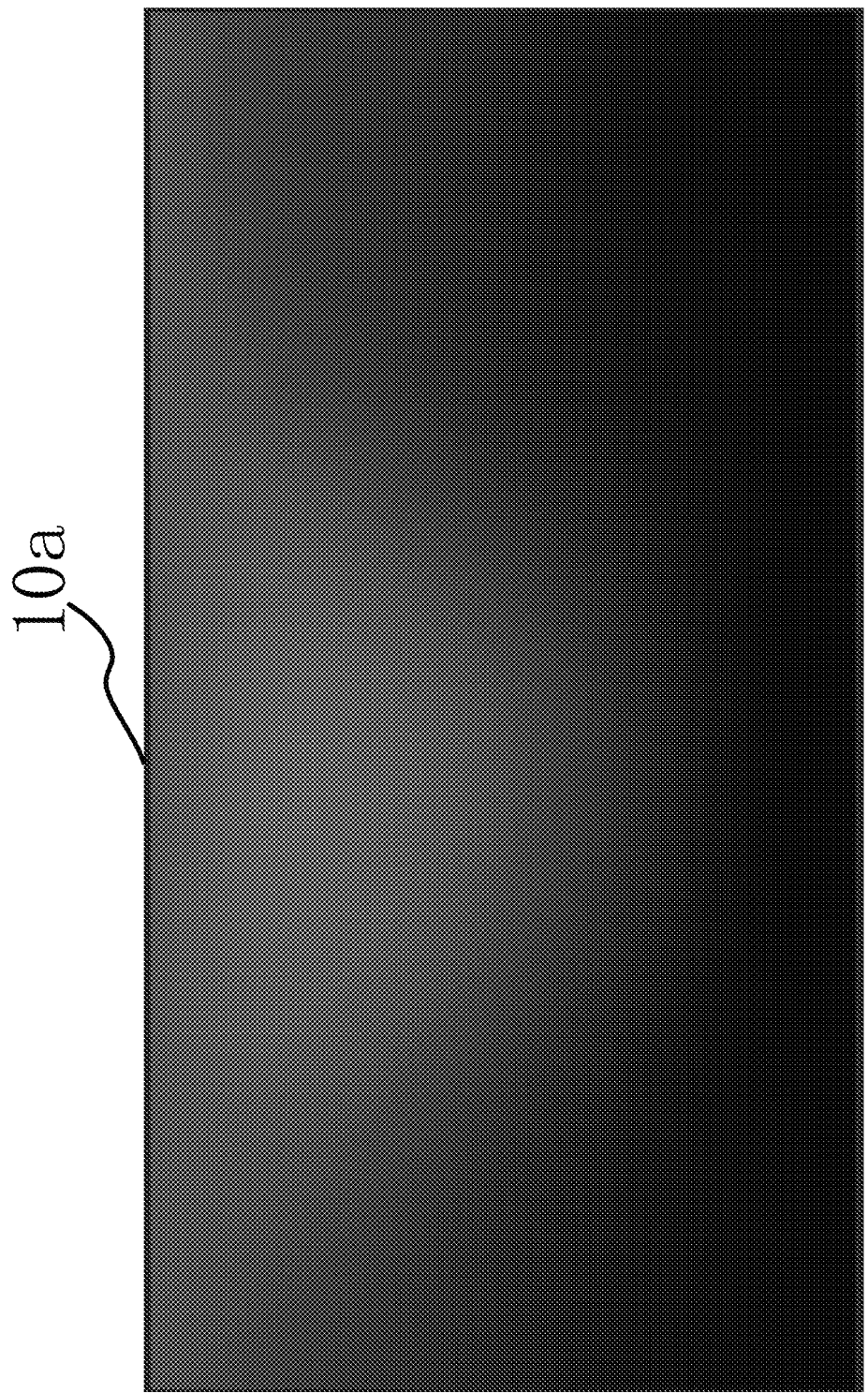
FIG. 10 is a schematic diagram of an effect of rendering a scene screen according to some embodiments.

For example, as shown in FIG. 9, which is a scene screen 92 in some embodiments, the scene screen 92 includes a distant light source 92a. As shown in FIG. 10, a schematic projection diagram 10a is a schematic diagram after projecting the distant light source 92a in FIG. 9. It can be seen that the brightness of the light source part and the region around the light source are relatively high.

Using the distant light source in the virtual scene as an example, when the day and night alternate, the distant light source rotates around the scene. The choice of the projection basis function select affects the baking of the radiance transfer parameter and the projection of the light source. Because the light source projection is an approximation of the distant light source, during rotation of the distant light source, if the projection basis function used does not have the characteristic of rotation invariance, the coefficient may jitter, resulting in the jitter of the scene illumination. In this embodiment, a spherical harmonic function is used as the projection basis function of the light source. Because the spherical harmonic function has the characteristics of rotation invariance and high projection performance, the illumination information in the virtual scene can be calculated more accurately, which can effectively improve the final illumination rendering effect and performance during running.

Specifically, the terminal can project the original light source to the projection basis function in advance according to state information of the original light source preset in the virtual scene, and further, calculate the initial projection coefficient based on the Monte Carlo method. Then, in a process of rendering the virtual scene, when the light source changes, for example, in rotation of the light source, after a light rotation matrix is calculated according to a rotation angle, multiplication between a matrix and a vector only needs to be performed once according to the initial projection coefficient, that is, the current light source projection coefficient after the light source changes can be updated. Compared with the method of calculating a light source projection coefficient by re-projecting a large quantity of samples each time, the method in this embodiment can effectively reduce consumption of computational resources.

Before rendering the to-be-rendered target pixel point in the virtual scene, the terminal needs to pre-bake the radiance transfer parameters corresponding to the pixel points of the static object in the virtual scene and the radiance transfer parameters corresponding to the light probe. Specifically, based on the PRT method, the radiance transfer parameters can be baked based on path tracing. In the conventional radiosity calculation, the illumination contribution of the entire distant light source to the scene is calculated. In this embodiment, only the brightness information of the indirect illumination in the virtual scene is considered. Specifically, only low-frequency indirect illumination is calculated in the radiance transfer parameter Transfer Vector. Specifically, a path integration-based method can be used, and the brightness of indirect illumination in the virtual scene can be represented as follows:

$$L_0 = \sum_0^\infty P(P_n)$$

$$P(P_n) = \int_A \int_A \cdots \int_A L_e * T(P_1) dA(P_2) dA(P_3) \ldots dA(P_n)$$

where $L_0$ represents brightness of light emitted from a position of an object to a specific direction, $L_e$ is brightness of a light source or a self-illumination object, $P(P_n)$ is a brightness contribution of a ray after N bounces, and $T(P_n)$ is an attenuation of brightness of light after N bounces.

In a process of baking the radiance transfer parameter, the light source in the virtual scene is projected onto the spherical harmonic basis function, and each projection basis function calculates a corresponding brightness contribution according to the foregoing steps.

In some embodiments, to speed up the baking performance of the radiance transfer parameter, the light brightness information of a plurality of projection basis functions can share the same light ejection path and be packed together for calculation. In this way, the radiance transfer parameter corresponding to the indirect illumination in the virtual scene can be baked more quickly.

For static objects in the virtual scene, illumination baking data of the static objects, that is, radiance transfer parameters, is stored in lightmaps corresponding to the static objects. Each texel in the lightmap stores corresponding brightness information, that is, each texel stores one piece of corresponding radiance transfer parameter information.

Specifically, after the original light source in the virtual scene is projected to the spherical harmonic basis function, pixel points on surfaces of the static object in the virtual scene receive corresponding brightness information. Then, for each pixel point on the static object, which corresponds to a texel in the lightmap, rays are emitted, with a world space position corresponding to a center of the texel as a starting point, to a hemispherical surface which a normal faces. Then, sampling is performed in the scene, to calculate the brightness attenuations of the rays after a plurality of bounces. When the light source intersects the object in the scene, brightness contributions of rays on the current basis function are calculated, then, the brightness contributions of the rays fitted, and corresponding radiance transfer parameters are further calculated according to the light brightness contributions obtained by fitting on the basis function.

An expression for fitting the radiance transfer parameters by emitting rays to the hemispherical surface can be as follows:

$$T = \oint_A L(w) \cos(\theta) d(w) = \frac{1}{N} \sum_{i=0}^{N} \frac{L(w_i)}{\pi}$$

where T represents a radiance transfer parameter, L(w) is a brightness of a ray incident according to a direction w, and θ is an angle between an incident direction and a normal. When rays are projected by using cosine weight, where pdf($w_i$)=cos(θ)*π, which is reduced to obtain a final fitting expression.

For a light probe in the virtual scene, an ambient cube is used to represent surfaces of the light probe in a plurality of directions. Each surface corresponds to one projection basis function, and one radiance transfer parameter is stored on the basis function corresponding to the surface. Baking data of a dynamic object in the virtual scene is stored in a light probe, and each surface of the light probe stores incident light information in each direction.

Specifically, for the baking of the light probe, rays are uniformly emitted to the entire spherical surface by using a position of the light probe as a starting point. For each ray, a calculation method thereof is the same as the calculation method corresponding to the lightmap. A brightness contribution corresponding to the rays on the basis function is accumulated, and then, is fitted to the corresponding basis function. For a ray and its corresponding brightness value, an angle of the ray is calculated according to a direction of the ray and a direction of each surface. When the angle is less than 90 degrees, the brightness contribution is accumulated to the radiance transfer parameter of the corresponding surface.

When the terminal renders a virtual scene, for example, runs an application including a virtual scene, the terminal needs to update a light source projection coefficient corresponding to the changed light source according to the real-time light source information. Using an example in which the light source is a distant light source, for example, sunlight, first, a coefficient of the distant light source projected to the basis function needs to be updated according to the sky light and sunlight of the current scene, and then, for a static object in the virtual scene, a stored pre-baked radiance transfer parameter of a corresponding pixel point is obtained from the corresponding lightmap, and then, a final brightness contribution, that is, the indirect illumination value of the static object, can be calculated directly according to the current light source projection coefficient and the obtained radiance transfer parameter, and be further mapped to the surface of the static object according to a texture mapping relationship.

The projection of the distant light source to the basis function can be sampled and calculated by using the Monte Carlo method. Specifically, rays may be uniformly in all directions starting from a center of a world coordinate system in the virtual scene, to solve a coefficient of the projection basis function. The expression for solving the light source projection coefficient of the projection basis function can be as follows:

$$a = \oint_s f(w)a(w)d(w) = \frac{1}{N}\sum_0^N \frac{f(w_i)a(w_i)}{pdf(w_i)}$$

where a represents solving a spherical harmonic coefficient that needs to be projected to a specific basis function, that is, a light source projection coefficient. s represents the entire spherical surface, w represents a solid angle, f(w) is a brightness value representing a direction of the solid angle, and a(w) is a corresponding spherical harmonic basis function. $w_i$ represents a parameter of a currently sampled solid angle, and pdf is a corresponding weight. When uniform spherical sampling is used, pdf is $1/4\pi$.

For the spherical harmonic basis function, a basis function can be first obtained through projection based on a default direction, and then, an illumination transform matrix is calculated when the light source changes. For example, when the light source rotates, a rotation matrix corresponding to spherical harmonics is calculated, and the matrix after the rotation is updated according to a default initial projection coefficient and the rotation matrix, so that the light source projection coefficient can be updated more quickly. The rotation matrix of spherical harmonics may be specifically as follows:

$$\begin{bmatrix} a' \\ b' \\ c' \\ d' \\ ... \end{bmatrix} = \begin{bmatrix} 1 & 0 & 0 & 0 & ... \\ 0 & X & X & X & ... \\ 0 & X & X & X & ... \\ 0 & X & X & X & ... \\ ... & ... & ... & ... & ... \end{bmatrix} * \begin{bmatrix} a \\ b \\ c \\ d \\ ... \end{bmatrix}$$

For a dynamic object in the virtual scene, a plurality of light probes around the dynamic object are obtained, and radiance transfer parameters stored correspondingly in a plurality of surfaces, which may be specifically 6 surfaces, of the light probes are obtained. Then, a light brightness of each surface of the light probe is according to the calculated current light source projection coefficient and a radiance transfer parameter corresponding to the surface, that is, an indirect illumination value corresponding to each surface of each light probe is calculated. Then, linear interpolation is performed on light brightness of the plurality of surrounding light probes, a final brightness of the target pixel point in this direction is then calculated according to the light brightness after the interpolation and a normal direction of a target pixel point on the dynamic object, thereby obtaining the indirect illumination value corresponding to the target pixel point.

In some embodiments, spherical harmonics can also be used to calculate the indirect illumination value of the dynamic object according to the light probes. Similar to the method of using the ambient cube, a projection coefficient on each basis function in the light probe is first calculated in real time according to the precomputed radiance transfer parameter stored in the light probe and the current light source projection coefficient, to obtain a spherical harmonic representation of the brightness of the light probe. Then, a diffuse spherical harmonic conversion parameter corresponding to the target pixel point is calculated according to the normal direction of the target pixel point on the dynamic object, and finally, dot product processing is performed according to the diffuse spherical harmonic conversion parameter and a spherical harmonic coefficient in the spherical harmonic representation corresponding to the light probe, so that a final indirect illumination value corresponding to the target pixel point of the dynamic object can be accurately calculated.

Figure 11:
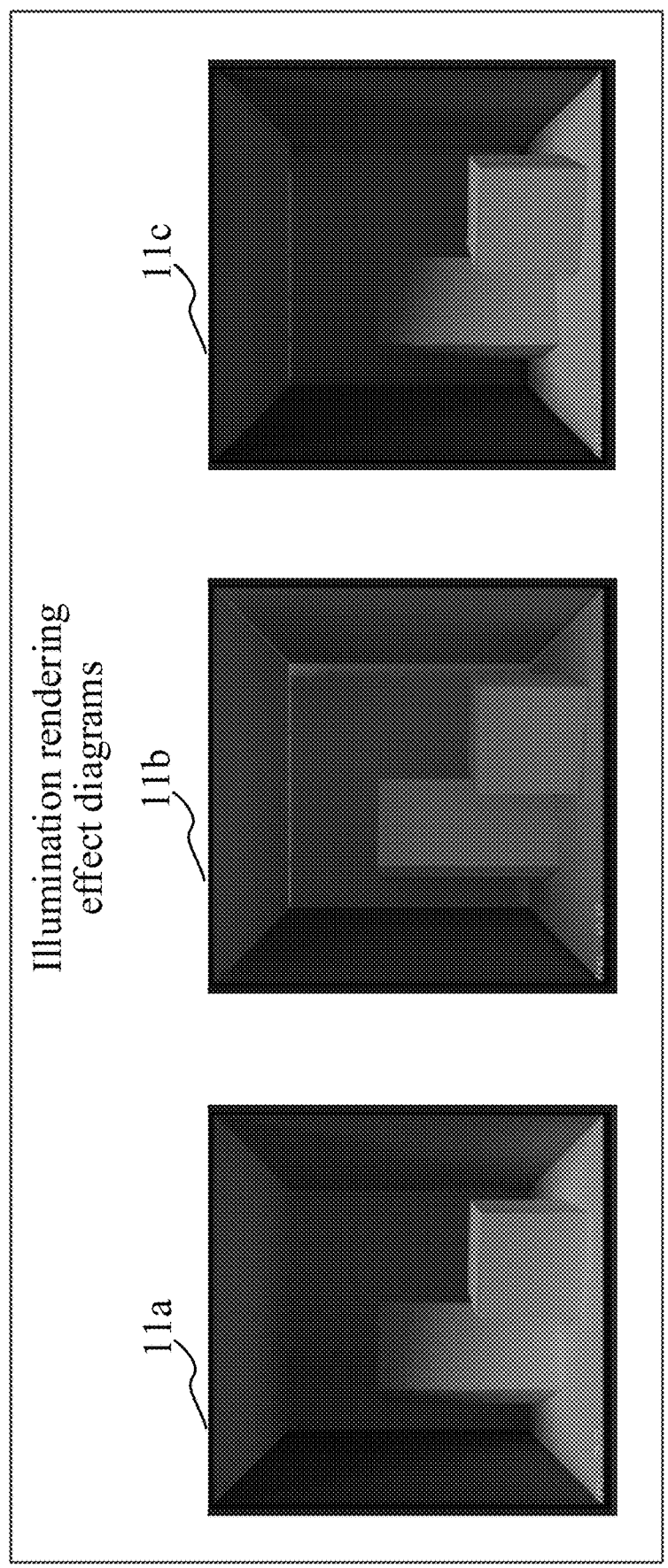
FIG. 11 is a schematic diagram of effects of performing illumination rendering in three different manners according to some embodiments.

In some embodiments, the direct illumination value and indirect illumination value corresponding to the target pixel point in the virtual scene are dynamically calculated respectively by splitting the direct illumination and the indirect illumination and using the PRT-based method. As shown in FIG. 11, a diagram 11a in FIG. 11 is an illumination rendering effect diagram of respectively calculating a direct illumination value and an indirect illumination value by splitting direct illumination and indirect illumination and using the PRT-based method in this embodiment. A diagram 11b in FIG. 11 is an illumination rendering effect diagram for the mixed calculation of direct illumination and indirect illumination using the PRT-based method. FIG. 11c in FIG. 11 is an illumination rendering effect diagram of calculating an indirect illumination value by using only the PRT-based method. It can be seen that by splitting direct illumination and indirect illumination, the entire indirect illumination in the virtual scene can be dynamically updated, and the high-frequency direct illumination and shadow information are also more accurate, so that the entire illumination effect in the virtual scene is better.

This application further provides an application scene. This application scene is a three-dimensional game scene of an open world type. The foregoing illumination rendering method is applied to the game scene. Specifically, the three-dimensional game scene of an open world type includes a virtual scene. The virtual scene includes a static object, a dynamic object, and a light probe, and further includes a distant light source that simulates the real world, for example, sunlight and sky light. Radiance transfer parameters of the static objects and light probes in the virtual scene are pre-baked and stored in the corresponding lightmaps and corresponding light probes.

A game application corresponding to the three-dimensional game scene is deployed in the terminal. When the game application in the terminal is run, a light source state of the distant light source in the three-dimensional game scene is detected in real time. When the distant light source in the virtual scene changes, light source change information is determined. A current light source projection coefficient corresponding to the distant changed light source is determined according to the light source change information Then, for a to-be-displayed target pixel point in the virtual scene, for a target pixel point belonging to the static object in the virtual scene, a pre-computed matching radiance transfer parameter is obtained from the corresponding lightmap, and an indirect illumination value of the target pixel point in the virtual scene is calculated according to the current light source projection coefficient and the radiance transfer parameter. For a target pixel point belonging to a dynamic object in the virtual scene, a pre-computed matching radiance transfer parameter is obtained from a corresponding light probe, and an indirect illumination value of the target pixel point in the virtual scene is calculated according to the current light source projection coefficient and the radiance transfer parameter.

The terminal also calculates a direct illumination value corresponding to the target pixel point under the changed light source according to the light source change information, so as to calculate the dynamic direct illumination value and the indirect illumination value of the dynamic object in the virtual scene in real time. The terminal further performs illumination rendering on the target pixel point according to the direct illumination value and the indirect illumination value. In this way, illumination rendering processing can be accurately and efficiently performed on the distant light source that changes in real time in the game scene, thereby effectively enhancing the illumination rendering effect under the dynamic distant light source in the virtual scene.

This application further provides an application scene. The application scene is a three-dimensional environment demonstration scene, for example, a tourism environment demonstration scene, a building demonstration scene, and a virtual training scene. The foregoing illumination rendering method under a three-dimensional scene is applied to the three-dimensional environment demonstration scene. The three-dimensional environment demonstration scenes in various environments include a virtual scene. The virtual scene includes a static object, a dynamic object, and a light probe.

Before the three-dimensional environment demonstration scene is displayed, radiance transfer parameters of the static objects and light probes in the virtual scene are pre-baked and stored in the corresponding lightmaps and corresponding light probes.

The terminal may be preloaded with scene data corresponding to the three-dimensional environment demonstration scene, or may obtain the required scene data from the server in real time. When demonstrating the three-dimensional environment demonstration scene, the terminal detects the light source state in the virtual scene in real time. When the light source in the virtual scene changes, the current light source projection coefficient corresponding to the to-be-displayed target pixel point in the virtual scene is updated in real time according to the light source change information, real-time.

Then, for a target pixel point belonging to a static object in the virtual scene, a pre-computed matching radiance transfer parameter is obtained from a corresponding lightmap, and an indirect illumination value of the target pixel point in the virtual scene is calculated according to the current light source projection coefficient and the radiance transfer parameter. For a target pixel point belonging to a dynamic object in the virtual scene, a pre-computed matching radiance transfer parameter is obtained from a corresponding light probe, and an indirect illumination value of the target pixel point in the virtual scene is calculated according to the current light source projection coefficient and the radiance transfer parameter.

The terminal also calculates a direct illumination value corresponding to the target pixel point under the changed light source according to the light source change information, so as to calculate the dynamic direct illumination value and the indirect illumination value of the dynamic object in the virtual scene in real time. The terminal further performs illumination rendering on the target pixel point according to the direct illumination value and the indirect illumination value. In this way, not only computational resources for indirect illumination can be effectively saved, but also illumination rendering processing can be accurately performed on the light source that changes in real time in the virtual scene, thereby effectively enhancing the illumination rendering effect under the distant light source in the virtual scene.

Although the steps in the flowcharts of the embodiments are displayed sequentially according to instructions of arrows, these steps are not necessarily performed sequentially according to a sequence instructed by the arrows. Unless otherwise clearly specified in this specification, the steps are performed without any strict sequence limit, and may be performed in other sequences. In addition, at least a part of the steps in the foregoing embodiments may include a plurality of steps or a plurality of stages. These steps or stages are not necessarily performed and completed at the same moment, and may be performed at different moments. Besides, the steps or stages may not be necessarily performed sequentially, and may be performed in turn or alternately with other steps or at least a part of steps or stages of other steps.

Figure 12:
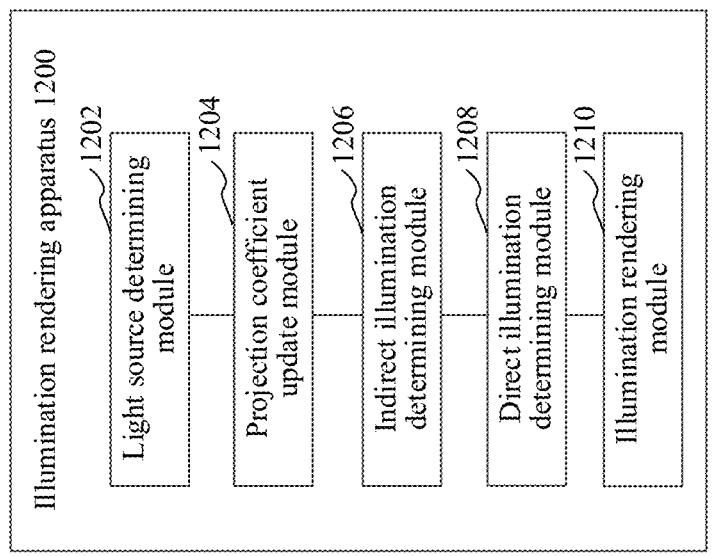
FIG. 12 is a structural block diagram of an illumination rendering apparatus according to some embodiments.

In some embodiments, as shown in FIG. 12, an illumination rendering apparatus 1200 is provided. The apparatus may be implemented as a part of the computer device by using a software module, a hardware module, or a combination thereof. The apparatus specifically includes a light source determining module 1202, a projection coefficient update module 1204, an indirect illumination determining module 1206, a direct illumination determining module 1208, and an illumination rendering module 1210.

The light source determining module 1202 is configured to determine light source change information when a light source changes in a virtual scene.

The projection coefficient update module 1204 is configured to determine a current light source projection coefficient corresponding to the changed light source according to the light source change information.

The indirect illumination determining module 1206 is configured to determine an indirect illumination value of a target pixel point in the virtual scene according to a radiance transfer parameter corresponding to the target pixel point in the virtual scene and the current light source projection coefficient.

The direct illumination determining module 1208 is configured to determine a direct illumination value corresponding to the target pixel point under the changed light source.

The illumination rendering module 1210 is configured to perform illumination rendering on the target pixel point according to the direct illumination value and the indirect illumination value.

In some embodiments, the projection coefficient update module 1204 is further configured to determine an illumination transform matrix according to the light source change information; determine an initial light source projection coefficient in the virtual scene before the light source changes; and determine the current light source projection coefficient corresponding to the changed light source according to the illumination transform matrix and the initial light source projection coefficient.

In some embodiments, the light source change information is change information generated by the changed light source relative to an original light source preset in the virtual scene. The projection coefficient update module 1204 is further configured to: obtain the initial light source projection coefficient obtained by projecting the original light source to a projection basis function; and update the initial light source projection coefficient according to the illumination transform matrix, to obtain the current light source projection coefficient corresponding to the changed light source.

In some embodiments, the light source change information is change information generated by the changed light source relative to a historical light source before the change in the virtual scene. The projection coefficient update module 1204 is further configured to: obtain a historical light source projection coefficient corresponding to the historical light source; and update the historical light source projection coefficient according to the illumination transform matrix, to obtain the current light source projection coefficient corresponding to the changed light source.

In some embodiments, the illumination rendering apparatus 1200 further includes a first transfer parameter obtaining module. The first transfer parameter obtaining module is further configured to: obtain, for a target pixel point belonging to a static object in the virtual scene, a lightmap matching the target pixel point; and obtain the radiance transfer parameter corresponding to the target pixel point in the virtual scene from the lightmap.

In some embodiments, the first transfer parameter obtaining module is further configured to: search, for a target pixel point belonging to a static object in the virtual scene, a lightmap of the static object based on a texture mapping relationship for a texel matching the target pixel point; and obtain the radiance transfer parameter corresponding to the target pixel point from the lightmap according to the matching texel.

In some embodiments, the illumination rendering apparatus 1200 further includes a second transfer parameter obtaining module. The second transfer parameter obtaining module is further configured to: obtain, for a target pixel point belonging to a dynamic object in the virtual scene, a light probe matching the target pixel point; and obtain the radiance transfer parameter corresponding to the target pixel point in the virtual scene from the light probe.

In some embodiments, the indirect illumination determining module 1206 is further configured to determine, for a target pixel point belonging to a dynamic object in the virtual scene, a light probe matching the target pixel point of the dynamic object; update light brightness corresponding to directions on the light probe according to the current light source projection coefficient and the radiance transfer parameter; perform interpolation on the updated light brightness corresponding to the light probe; and determine the indirect illumination value of the target pixel point in the virtual scene according to the light brightness after the interpolation and a normal direction of the target pixel point.

In some embodiments, the illumination rendering apparatus further includes a radiance transfer parameter baking module, configured to project an original light source to a plurality of projection basis functions, and use all the projection basis functions after the projection as corresponding virtual light sources respectively; determine, for pixel points of a static object in the virtual scene, radiance transfer parameters corresponding to the virtual light sources on the pixel points based on ray tracing, and store the radiance transfer parameters into a corresponding lightmap; and determine, for a light probe in the virtual scene, radiance transfer parameters corresponding to the virtual light sources on the light probe based on ray tracing, and storing the radiance transfer parameters into the light probe.

In some embodiments, the radiance transfer parameter baking module is further configured to: obtain, for each pixel point of the static object in the virtual scene, light brightness corresponding to the virtual light sources at the pixel point after the projection; emit, with the pixel point as a starting point, rays with the light brightness to a hemispherical surface to which a normal of the pixel point points; sample, in the virtual scene, reflection brightness and brightness attenuations of the rays after the rays are reflected by the hemispherical surface; and determine the radiance transfer parameter corresponding to the pixel point based on the reflection brightness and the light source brightness corresponding to the rays, and store the radiance transfer parameter to the corresponding lightmap.

In some embodiments, the radiance transfer parameter baking module is further configured to: obtain, for the light probe in the virtual scene, light brightness corresponding to the virtual light sources on faces of the light probe after the projection; emit, with a center point of the light probe as a starting point, rays to a spherical surface with the center point as a center and a preset radius based on the light brightness; sample, in the virtual scene, reflection brightness and brightness attenuations of the rays after the rays are reflected by the spherical surface; and determine radiance transfer parameters corresponding to the light probe based on the reflection brightness and the brightness attenuations corresponding to the rays, and store the radiance transfer parameters to the light probe.

In some embodiments, the virtual scene is a virtual game scene, and the light source in the virtual game scene is a distant light source. The light source determining module 1202 is further configured to monitor a light source direction of the distant light source in the virtual game scene when the virtual game scene is run; and determine, when the light source direction changes, the light source change information according to the changed light source direction and an initial light source direction of the distant light source.

For a specific limitation on the illumination rendering apparatus, reference may be made to the limitation on the illumination rendering method above. The modules in the foregoing illumination rendering apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a terminal, and an internal structure diagram thereof may be shown in FIG. 13. The computer device includes a processor, a memory, a communication interface, a display screen, and an input apparatus that are connected by using a system bus. The processor of the computer device is configured to provide computing and control capabilities. The memory of the computer device includes a non-transitory storage medium and an internal memory. The non-transitory storage medium stores an operating system and computer-readable instructions. The internal memory provides an environment for running of the operating system and the computer-readable instructions in the non-transitory storage medium. The communication interface of the computer device is used for wired or wireless communication with an external terminal. The wireless manner may be implemented through Wi-Fi, an operator network, near field communication (NFC), or other technologies. The computer-readable instructions, when executed by the processor, implement an illumination rendering method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 13:
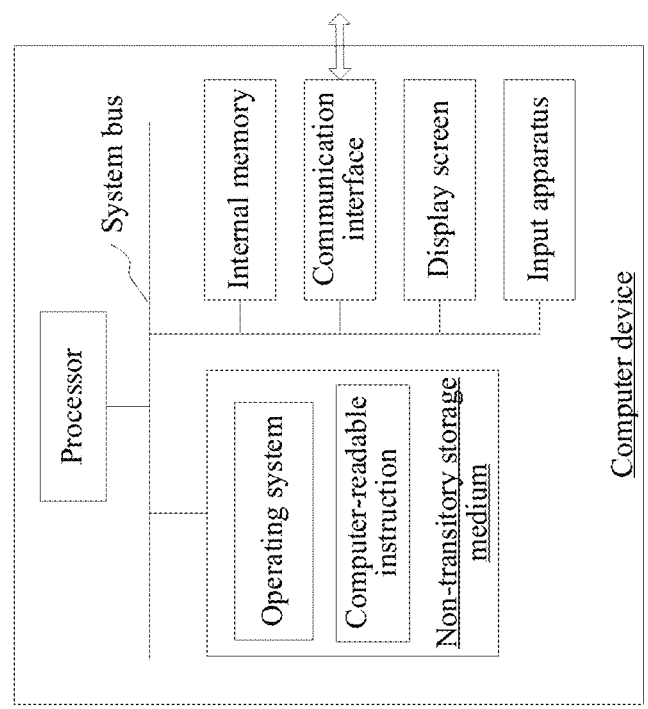
FIG. 13 is a diagram of an internal structure of a computer device according to some embodiments.

A person skilled in the art may understand that, the structure shown in FIG. 13 is only a block diagram of a part of a structure related to a solution of this application and does not limit the computer device to which the solution of this application is applied. Specifically, the computer device may include more or fewer members than those in the drawings, or include a combination of some members, or include different member layouts.

In some embodiments, a computer device is further provided, including: a memory and one or more processors, the memory storing computer-readable instructions, the computer-readable instructions, when executed by the one or more processors, causing the one or more processors to implement the steps in the foregoing method embodiments.

In some embodiments, one or more non-transitory readable storage media are provided, storing computer readable instructions, the computer readable instructions, when executed by one or more processors, causing the one or more processors to implement the steps in the foregoing method embodiments.

In some embodiments, a computer program product is provided, including computer-readable instructions, the computer-readable instructions, when executed by a processor, implementing the steps in the foregoing method embodiments.

A person of ordinary skill in the art may understand that all or some of the procedures of the methods of the foregoing embodiments may be implemented by computer-readable instructions instructing relevant hardware. The computer-readable instructions may be stored in a non-transitory computer-readable storage medium. When the computer-readable instructions are executed, the procedures of the embodiments of the foregoing methods may be included. Any reference to a memory, a storage, a database, or another medium used in the embodiments provided in this application may include at least one of a non-transitory memory and a volatile memory. The non-transitory memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments only describe several implementations of this application specifically and in detail, but cannot be construed as a limitation to the patent scope of this application. A person of ordinary skill in the art may make various changes and improvements without departing from the ideas of this application, which shall all fall within the protection scope of this application. Therefore, the protection scope of this application is subject to the protection scope of the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. An illumination rendering method, performed by a computer device, the method comprising:
    determining light source change information when a light source changes in a virtual scene;
    determining a current light source projection coefficient corresponding to the changed light source according to the light source change information;
    determining an indirect illumination value of a target pixel point in the virtual scene according to a radiance transfer parameter corresponding to the target pixel point in the virtual scene and the current light source projection coefficient;
    determining a direct illumination value corresponding to the target pixel point under the changed light source; and
    performing illumination rendering on the target pixel point according to the direct illumination value and the indirect illumination value.

2. The method according to claim 1, wherein the determining the current light source projection coefficient corresponding to the changed light source according to the light source change information comprises:
- determining an illumination transform matrix according to the light source change information;
- determining an initial light source projection coefficient in the virtual scene before the light source changes; and
- determining the current light source projection coefficient corresponding to the changed light source according to the illumination transform matrix and the initial light source projection coefficient.

3. The method according to claim 1, wherein the radiance transfer parameter corresponding to the target pixel point in the virtual scene is obtained by:
- obtaining, for the target pixel point belonging to a static object in the virtual scene, a lightmap matching the target pixel point; and
- obtaining the radiance transfer parameter corresponding to the target pixel point in the virtual scene from the lightmap.

4. The method according to claim 3, wherein the obtaining the radiance transfer parameter corresponding to the target pixel point in the virtual scene from the lightmap comprises:
- searching, for the target pixel point belonging to the static object in the virtual scene, a lightmap of the static object based on a texture mapping relationship for a texel matching the target pixel point; and
- obtaining the radiance transfer parameter corresponding to the target pixel point from the lightmap according to the matching texel.

5. The method according to claim 1, wherein the radiance transfer parameter corresponding to the target pixel point in the virtual scene is obtained by:
- obtaining, for the target pixel point belonging to a dynamic object in the virtual scene, a light probe matching the target pixel point of the dynamic object; and
- obtaining the radiance transfer parameter corresponding to the target pixel point in the virtual scene from the light probe.

6. The method according to claim 5, wherein the determining the indirect illumination value of the target pixel point in the virtual scene according to the radiance transfer parameter corresponding to the target pixel point in the virtual scene and the current light source projection coefficient comprises:
- updating light brightness corresponding to directions on the light probe according to the current light source projection coefficient and the radiance transfer parameter;
- performing interpolation on the updated light brightness corresponding to the light probe; and
- determining the indirect illumination value of the target pixel point in the virtual scene according to the light brightness after the interpolation and a normal direction of the target pixel point.

7. The method according to claim 1, wherein before the determining the light source change information when the light source changes in the virtual scene, the method further comprises:
- projecting an original light source to a plurality of projection basis functions, and using the projection basis functions after the projection as corresponding virtual light sources respectively;
- determining, for pixel points of a static object in the virtual scene, radiance transfer parameters corresponding to the virtual light sources on the pixel points based on ray tracing, and storing the radiance transfer parameters into a corresponding lightmap; and
- determining, for a light probe in the virtual scene, radiance transfer parameters corresponding to the virtual light sources on the light probe based on ray tracing, and storing the radiance transfer parameters into the light probe.

8. The method according to claim 1, wherein the virtual scene is a virtual game scene, and the light source in the virtual game scene is a distant light source; and
the determining the light source change information when the light source changes in the virtual scene comprises:
- monitoring a light source direction of the distant light source in the virtual game scene when the virtual game scene is run; and
- determining, when the light source direction changes, the light source change information according to the changed light source direction and an initial light source direction of the distant light source.

9. A computer device, comprising a memory and one or more processors, the memory storing computer-readable instructions, the computer-readable instructions, when executed by the one or more processors, causing the computer device to perform an illumination rendering method including:
- determining light source change information when a light source changes in a virtual scene;
- determining a current light source projection coefficient corresponding to the changed light source according to the light source change information;
- determining an indirect illumination value of a target pixel point in the virtual scene according to a radiance transfer parameter corresponding to the target pixel point in the virtual scene and the current light source projection coefficient;
- determining a direct illumination value corresponding to the target pixel point under the changed light source; and
- performing illumination rendering on the target pixel point according to the direct illumination value and the indirect illumination value.

10. The computer device according to claim 9, wherein the determining the current light source projection coefficient corresponding to the changed light source according to the light source change information comprises:
- determining an illumination transform matrix according to the light source change information;
- determining an initial light source projection coefficient in the virtual scene before the light source changes; and
- determining the current light source projection coefficient corresponding to the changed light source according to the illumination transform matrix and the initial light source projection coefficient.

11. The computer device according to claim 9, wherein the radiance transfer parameter corresponding to the target pixel point in the virtual scene is obtained by:
- obtaining, for the target pixel point belonging to a static object in the virtual scene, a lightmap matching the target pixel point; and
- obtaining the radiance transfer parameter corresponding to the target pixel point in the virtual scene from the lightmap.

12. The computer device according to claim 11, wherein the obtaining the radiance transfer parameter corresponding to the target pixel point in the virtual scene from the lightmap comprises:

searching, for the target pixel point belonging to the static object in the virtual scene, a lightmap of the static object based on a texture mapping relationship for a texel matching the target pixel point; and obtaining the radiance transfer parameter corresponding to the target pixel point from the lightmap according to the matching texel.

13. The computer device according to claim 9, wherein the radiance transfer parameter corresponding to the target pixel point in the virtual scene is obtained by obtaining, for the target pixel point belonging to a dynamic object in the virtual scene, a light probe matching the target pixel point of the dynamic object; and obtaining the radiance transfer parameter corresponding to the target pixel point in the virtual scene from the light probe.

14. The computer device according to claim 13, wherein the determining the indirect illumination value of the target pixel point in the virtual scene according to the radiance transfer parameter corresponding to the target pixel point in the virtual scene and the current light source projection coefficient comprises:

updating light brightness corresponding to directions on the light probe according to the current light source projection coefficient and the radiance transfer parameter;

performing interpolation on the updated light brightness corresponding to the light probe; and determining the indirect illumination value of the target pixel point in the virtual scene according to the light brightness after the interpolation and a normal direction of the target pixel point.

15. The computer device according to claim 9, wherein before the determining the light source change information when the light source changes in the virtual scene, the method further comprises:

projecting an original light source to a plurality of projection basis functions, and using the projection basis functions after the projection as corresponding virtual light sources respectively;

determining, for pixel points of a static object in the virtual scene, radiance transfer parameters corresponding to the virtual light sources on the pixel points based on ray tracing, and storing the radiance transfer parameters into a corresponding lightmap; and determining, for a light probe in the virtual scene, radiance transfer parameters corresponding to the virtual light sources on the light probe based on ray tracing, and storing the radiance transfer parameters into the light probe.

16. The computer device according to claim 9, wherein the virtual scene is a virtual game scene, and the light source in the virtual game scene is a distant light source; and the determining the light source change information when the light source changes in the virtual scene comprises:

monitoring a light source direction of the distant light source in the virtual game scene when the virtual game scene is run; and determining, when the light source direction changes, the light source change information according to the changed light source direction and an initial light source direction of the distant light source.

17. One or more non-transitory readable storage media, storing computer-readable instructions, the computer-readable instructions, when executed by one or more processors of a computer device, causing the computer device to perform an illumination rendering method including:

determining light source change information when a light source changes in a virtual scene;

determining a current light source projection coefficient corresponding to the changed light source according to the light source change information;

determining an indirect illumination value of a target pixel point in the virtual scene according to a radiance transfer parameter corresponding to the target pixel point in the virtual scene and the current light source projection coefficient;

determining a direct illumination value corresponding to the target pixel point under the changed light source; and performing illumination rendering on the target pixel point according to the direct illumination value and the indirect illumination value.

18. The non-transitory readable storage media according to claim 17, wherein the determining the current light source projection coefficient corresponding to the changed light source according to the light source change information comprises:

determining an illumination transform matrix according to the light source change information;

determining an initial light source projection coefficient in the virtual scene before the light source changes; and determining the current light source projection coefficient corresponding to the changed light source according to the illumination transform matrix and the initial light source projection coefficient.

19. The non-transitory readable storage media according to claim 17, wherein the radiance transfer parameter corresponding to the target pixel point in the virtual scene is obtained by:

obtaining, for the target pixel point belonging to a static object in the virtual scene, a lightmap matching the target pixel point; and obtaining the radiance transfer parameter corresponding to the target pixel point in the virtual scene from the lightmap.

20. The non-transitory readable storage media according to claim 17, wherein the virtual scene is a virtual game scene, and the light source in the virtual game scene is a distant light source; and the determining the light source change information when the light source changes in the virtual scene comprises:

monitoring a light source direction of the distant light source in the virtual game scene when the virtual game scene is run; and determining, when the light source direction changes, the light source change information according to the changed light source direction and an initial light source direction of the distant light source.

* * * * *